(12) United States Patent
Morokuma et al.

(10) Patent No.: US 9,502,954 B2
(45) Date of Patent: Nov. 22, 2016

(54) SIGNAL TRANSMISSION CIRCUIT AND POWER CONVERSION DEVICE EQUIPPED WITH SAME

(71) Applicant: Mitsubishi Electric Corporation, Chiyoda-ku (JP)

(72) Inventors: Kenichi Morokuma, Chiyoda-ku (JP); Jun Tomisawa, Chiyoda-ku (JP); (Continued)

(73) Assignee: Mitsubishi Electric Corporation, Chiyoda-ku (JP)

( * ) Notice: Subject to any disclaimer, the term of this patent is extended or adjusted under 35 U.S.C. 154(b) by 0 days.

(21) Appl. No.: 14/769,924

(22) PCT Filed: Oct. 28, 2013

(86) PCT No.: PCT/JP2013/079123
§ 371 (c)(1),
(2) Date: Aug. 24, 2015

(87) PCT Pub. No.: WO2014/147882
PCT Pub. Date: Sep. 25, 2014

(65) Prior Publication Data
US 2016/0020686 A1 Jan. 21, 2016

(30) Foreign Application Priority Data

Mar. 20, 2013 (JP) ................................. 2013-057445

(51) Int. Cl.
*H04B 3/00* (2006.01)
*H02M 1/08* (2006.01)

(52) U.S. Cl.
CPC .................................... *H02M 1/08* (2013.01)

(58) Field of Classification Search
CPC ........................................................ H02M 1/08
See application file for complete search history.

(56) References Cited

U.S. PATENT DOCUMENTS

2007/0091651 A1* 4/2007 Jang ......................... H02M 1/08 363/21.01
2009/0309643 A1* 12/2009 Suzuki ..................... H02M 1/08 327/276

(Continued)

FOREIGN PATENT DOCUMENTS

JP 2010 10762 1/2010
WO 2011 055611 5/2011

OTHER PUBLICATIONS

International Search Report Issued Jan. 28, 2014 in PCT/JP2013/079123 filed Oct. 28, 2013.

*Primary Examiner* — Kenneth Lam
(74) *Attorney, Agent, or Firm* — Oblon, McClelland, Maier & Neustadt, L.L.P.

(57) ABSTRACT

A signal transmission circuit includes, in each of a first circuit connected to a first coil of an insulating transformer and a second circuit connected to a second coil of the insulating transformer, a transmitting circuit, a receiving circuit, a coil-side switching circuit, an input/output-side switching circuit, an abnormality detection circuit, a delay circuit, and a direction control section. In the signal transmission circuit, the direction control section controls the switching circuit to switch a signal direction between input and output, and the switching circuit switches between transmission and reception. The delay circuit delays a received signal and returns the resultant signal to the transmitting side, and the abnormality detection circuit detects abnormality to perform self-diagnosis.

19 Claims, 26 Drawing Sheets

(72) Inventors: Tetsuya Uchida, Chiyoda-ku (JP);
Kazuyasu Nishikawa, Chiyoda-ku (JP)

(56) References Cited

U.S. PATENT DOCUMENTS

| | | | |
|---|---|---|---|
| 2009/0322380 A1* | 12/2009 | Yanagishima | H02M 1/08 327/73 |
| 2011/0012542 A1* | 1/2011 | Inamura | H02M 1/08 318/139 |
| 2012/0051099 A1* | 3/2012 | Funaba | H02M 1/08 363/21.17 |
| 2012/0212251 A1 | 8/2012 | Yanagishima et al. | |
| 2013/0194830 A1* | 8/2013 | Nishino | H02M 1/08 363/20 |
| 2014/0376281 A1* | 12/2014 | Ohashi | H02M 3/158 363/25 |
| 2015/0078039 A1* | 3/2015 | Miyauchi | H02M 1/08 363/21.12 |
| 2015/0137843 A1 | 5/2015 | Yanagishima et al. | |

\* cited by examiner

US 9,502,954 B2

SIGNAL TRANSMISSION CIRCUIT AND POWER CONVERSION DEVICE EQUIPPED WITH SAME

TECHNICAL FIELD

The present invention relates to a signal transmission circuit which has a self-diagnosis function and transmits a signal via a transformer, and a power conversion device equipped with the same.

BACKGROUND ART

For example, in an inverter which drive-controls a three-phase AC motor or the like, a conventional signal transmission circuit is used in a drive circuit device for a power semiconductor switching element within the inverter, and is described below.

A signal transmission circuit device as a conventional signal transmission circuit has a main path and a self-diagnosis function, and includes: a signal input terminal to which a control input signal is inputted; a transmission pulse generation circuit which generates a transmission pulse signal synchronized with the control input signal; a first signal transmission circuit which transmits the transmission pulse signal to a subsequent stage; a first receiving circuit which receives the transmission pulse signal outputted from the first signal transmission circuit and reproduces a signal substantially equivalent to the control input signal; a signal output terminal from which the reproduced signal is outputted as a control output signal; a feedback pulse transmitting circuit which generates a feedback pulse signal synchronized with the control output signal; a second signal transmission circuit which transmits the feedback pulse signal to a subsequent stage; and a second receiving circuit which receives the control input signal and the feedback pulse signal and compares the control input signal with a signal which is waveform-shaped on the basis of the feedback pulse signal. In addition, the main path is divided into a transmitting side and a receiving side with the first signal transmission circuit as a boundary, the self-diagnosis function is divided into a transmitting side and a receiving side with the second signal transmission circuit as a boundary, and each of main circuits of the first signal transmission circuit and the second signal transmission circuit includes a photocoupler or a transformer (e.g., see Patent Document 1).

CITATION LIST

Patent Document

Patent Document 1: Japanese Laid-Open Patent Publication No. 2010-10762

SUMMARY OF THE INVENTION

Problems to be Solved by the Invention

Since the conventional signal transmission circuit is configured as described above, an insulating element composed of a photocoupler or a transformer is required in each of the first signal transmission circuit used for the main path and the second signal transmission circuit used for the self-diagnosis function. Thus, there are limits to simplification of a circuit configuration and decrease in a circuit area and a mounting area, and it is difficult to reduce the cost.

The present invention has been made in order to solve the above-described problem, and an object of the present invention is to provide a signal transmission circuit which has a self-diagnosis function and which promotes simplification of a circuit configuration and decrease in a circuit area and a mounting area to reduce the cost, and a power conversion device equipped with the same.

Solution to the Problems

A signal transmission circuit according to the present invention includes: an insulating transformer including a first coil and a second coil; a first circuit connected to the first coil; and a second circuit connected to the second coil, transmits a first input signal inputted to the first circuit, and outputs the transmitted signal as a second output signal from the second circuit. The first circuit includes: a first transmitting circuit for generating and outputting a transmission signal to the first coil in accordance with change in a logical value of an inputted signal A; a first receiving circuit for receiving a signal from the first coil, demodulating the signal into a binary signal having a logical value, and outputting the binary signal; a first switching circuit for switching a connection destination of the first coil between the first transmitting circuit and the first receiving circuit; and a first abnormality detection circuit for comparing the output signal from the first receiving circuit with the signal A to be inputted to the first transmitting circuit, to detect abnormality, and outputting a first abnormality signal. The second circuit includes: a second transmitting circuit for generating and outputting a transmission signal to the second coil in accordance with change in a logical value of an inputted signal B; a second receiving circuit for receiving a signal from the second coil, demodulating the signal into a binary signal having a logical value, and outputting the binary signal; a second switching circuit for switching a connection destination of the second coil between the second transmitting circuit and the second receiving circuit; and a second delay circuit for outputting a delay signal obtained by delaying the output signal from the second receiving circuit by a set time. The first input signal inputted to the first circuit is inputted as the signal A to the first transmitting circuit, the transmission signal from the first transmitting circuit is received via the insulating transformer by the second receiving circuit of the second circuit, and the output signal of the second receiving circuit is outputted as the second output signal from the second circuit. The delay signal obtained by the delaying by the second delay circuit of the second circuit is inputted as the signal B to the second transmitting circuit, the transmission signal from the second transmitting circuit is received via the insulating transformer by the first receiving circuit of the first circuit, and the first abnormality signal outputted by the first abnormality detection circuit on the basis of the output signal of the first receiving circuit and the signal A is outputted from the first circuit.

A power conversion device according to the present invention includes: a power semiconductor switching element; a drive circuit for driving the power semiconductor switching element; a control section for generating a control signal for controlling the power semiconductor switching element; and a signal transmission circuit connected between the control section and the drive circuit to insulate the control section and the drive circuit from each other, the signal transmission circuit transmitting a control signal from the control section to the drive circuit. The signal transmission circuit includes: an insulating transformer including a first coil and a second coil; a first circuit connected to the first coil; and a second circuit connected to the second coil. The first circuit includes: a first transmitting circuit for generating and outputting a transmission signal to the first coil in accordance with change in a logical value of an inputted signal A; a first receiving circuit for receiving a signal from the first coil, demodulating the signal into a binary signal having a logical value, and outputting the binary signal; a first switching circuit for switching a connection destination of the first coil between the first transmitting circuit and the first receiving circuit; and a first abnormality detection circuit for comparing the output signal from the first receiving circuit with the signal A to be inputted to the first transmitting circuit, to detect abnormality, and outputting a first abnormality signal. The second circuit includes: a second transmitting circuit for generating and outputting a transmission signal to the second coil in accordance with change in a logical value of an inputted signal B; a second receiving circuit for receiving a signal from the second coil, demodulating the signal into a binary signal having a logical value, and outputting the binary signal; a second switching circuit for switching a connection destination of the second coil between the second transmitting circuit and the second receiving circuit; and a second delay circuit for outputting a delay signal obtained by delaying the output signal from the second receiving circuit by a set time. The control signal inputted from the control section to the first circuit is inputted as the signal A to the first transmitting circuit, the transmission signal from the first transmitting circuit is received via the insulating transformer by the second receiving circuit of the second circuit, and the output signal of the second receiving circuit is outputted from the second circuit to the drive circuit. The delay signal obtained by the delaying by the second delay circuit of the second circuit is inputted as the signal B to the second transmitting circuit, the transmission signal from the second transmitting circuit is received via the insulating transformer by the first receiving circuit of the first circuit, and the first abnormality signal outputted by the first abnormality detection circuit on the basis of the output signal of the first receiving circuit and the signal A is outputted from the first circuit to the control section.

Effect of the Invention

Since the signal transmission circuit according to the present invention is configured as described above, it is possible to achieve signal transmission and self-diagnosis by using the common insulating transformer, and it is possible to provide a low-cost signal transmission circuit having a self-diagnosis function with a simple circuit configuration having a decreased circuit area and a decreased mounting area.

In addition, since the power conversion device according to the present invention is configured as described above, it is possible to realize the signal transmission circuit which transmits the control signal from the control section to the drive circuit insulated from the control section, with a simple and small-sized circuit configuration having a self-diagnosis function, and it is possible to promote size reduction and cost reduction of the power conversion device which has high reliability in signal transmission of the control signal and has improved controllability.

DESCRIPTION OF EMBODIMENTS

Embodiment 1

Figure 1:
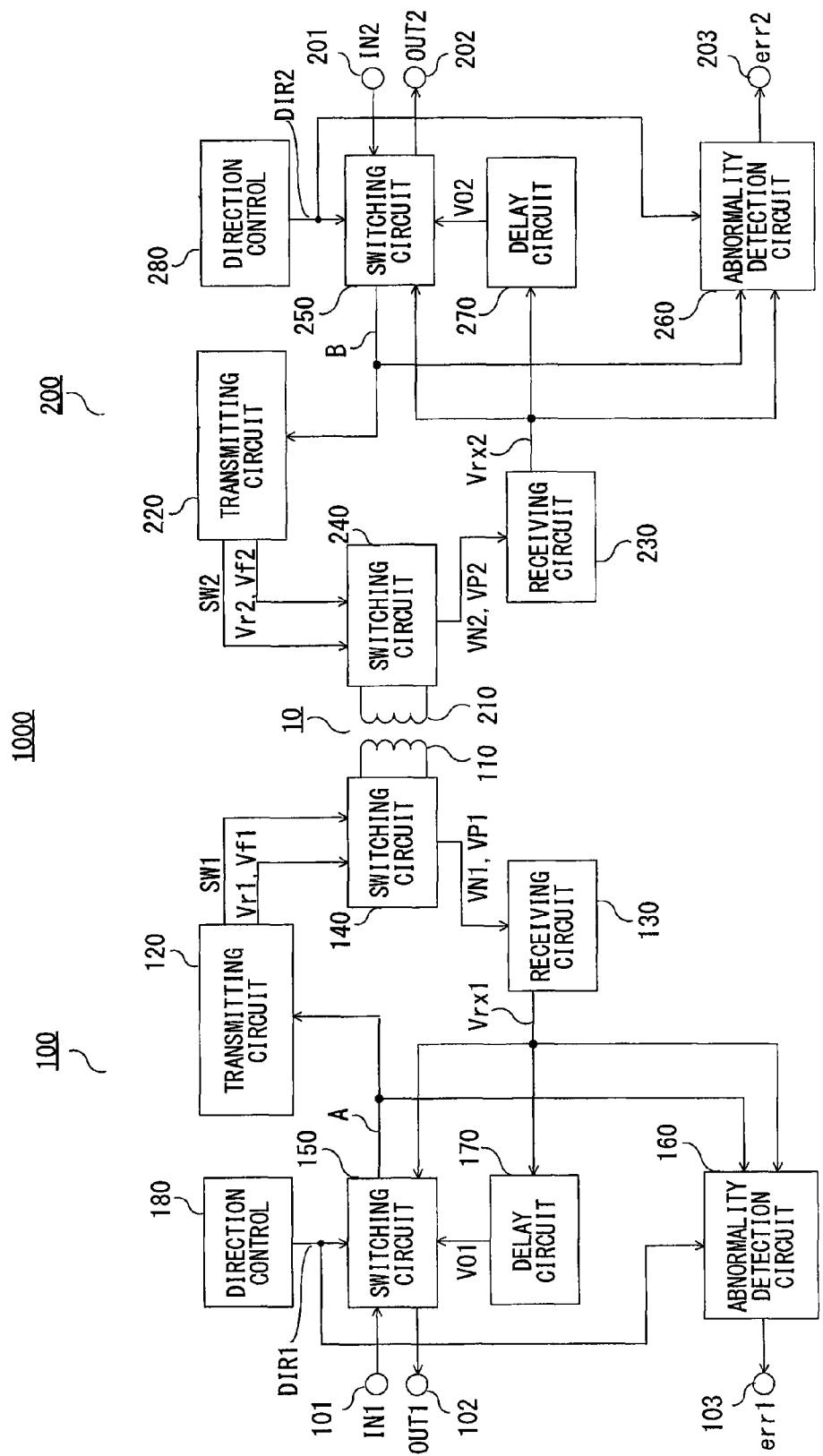
FIG. 1 is a block diagram showing a schematic configuration of a signal transmission circuit according to Embodiment 1 of the present invention.

Hereafter, a signal transmission circuit according to Embodiment 1 of the present invention will be described based on the drawings. It is noted that in each embodiment described below, the same components are designated by the same reference characters.

FIG. 1 is a block diagram showing a schematic configuration of a signal transmission circuit 1000 according to Embodiment 1 of the present invention. As shown in FIG. 1, the signal transmission circuit 1000 includes: an insulating transformer 10 including a first coil 110 and a second coil 210; a first circuit 100 connected to the first coil 110; and a second circuit 200 connected to the second coil 210, and performs bidirectional signal transmission with abnormality detection by self-diagnosis.

Figure 2:
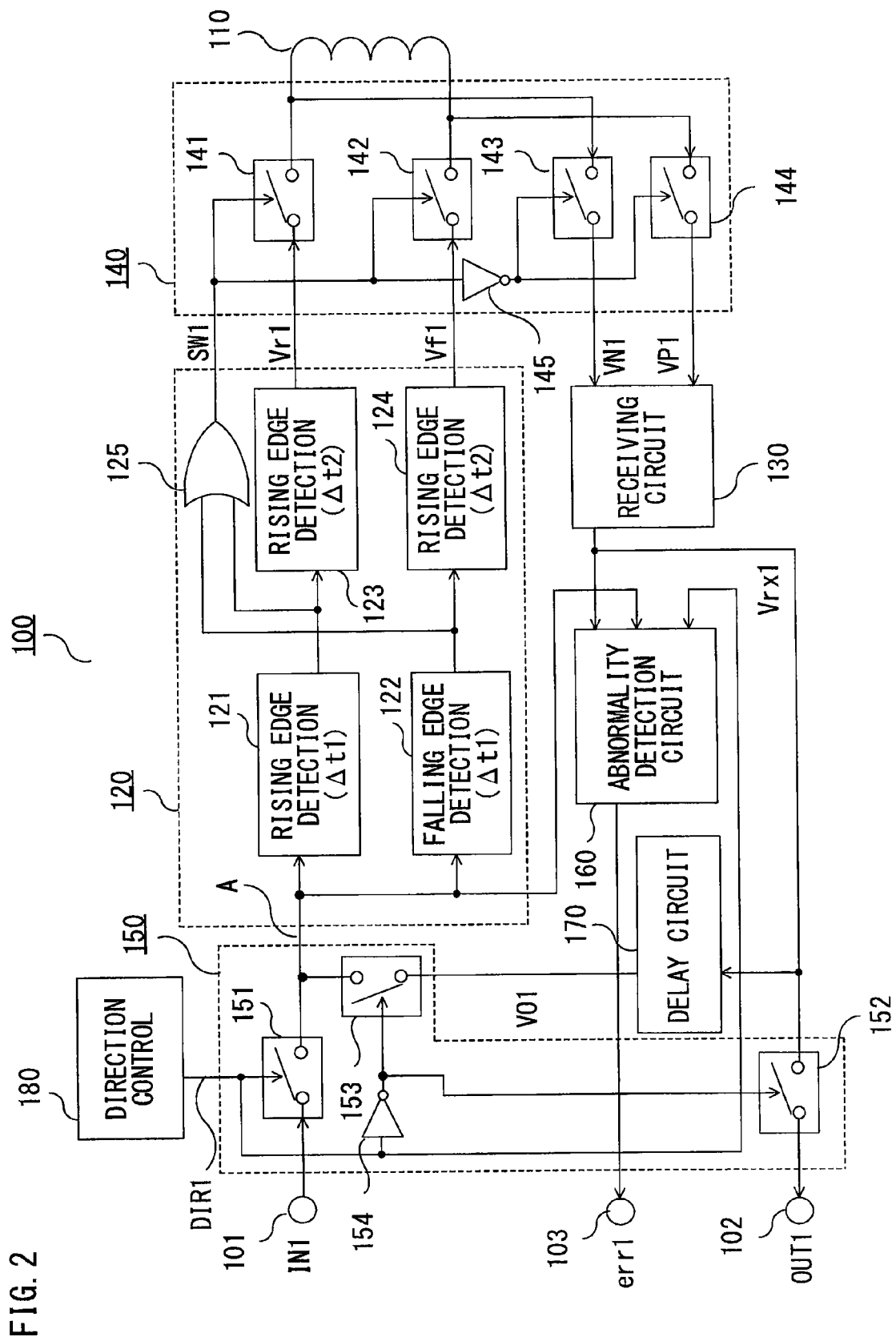
FIG. 2 is a diagram showing the configuration of a first circuit of the signal transmission circuit according to Embodiment 1 of the present invention.
Figure 3:
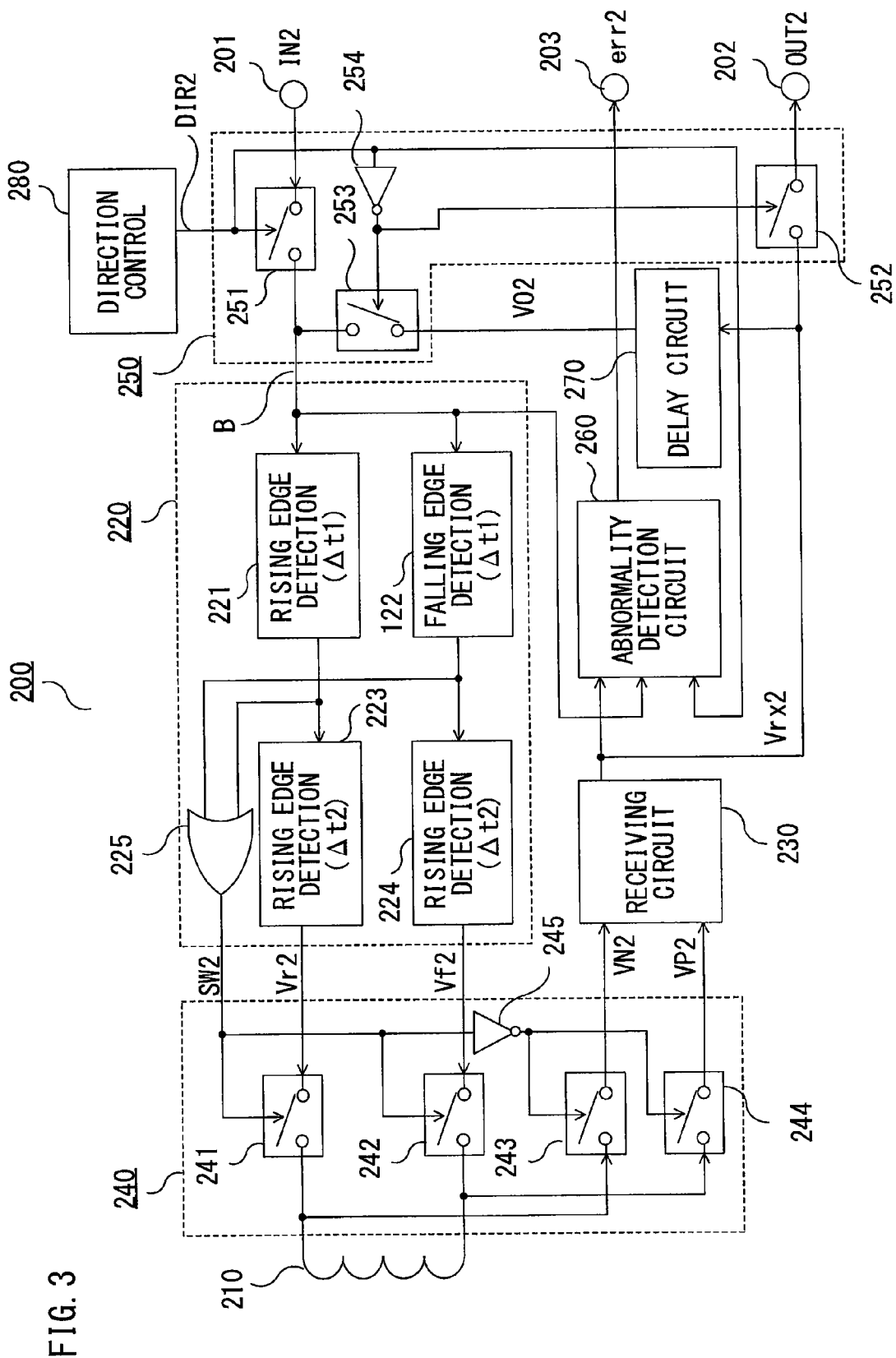
FIG. 3 is a diagram showing the configuration of a second circuit of the signal transmission circuit according to Embodiment 1 of the present invention.

FIG. 2 shows the circuit configuration of the first circuit 100, and FIG. 3 shows the circuit configuration of the second circuit 200.

As shown in FIGS. 1 to 3, the signal transmission circuit 1000 transmits a first input signal IN1 inputted to an input terminal 101 of the first circuit 100, via the insulating transformer 10 and outputs the transmitted signal as a second output signal OUT2 from an output terminal 202 of the second circuit 200, and also outputs a first abnormality signal err1 from an abnormality output terminal 103 of the first circuit 100 through self-diagnosis. In addition, the signal transmission circuit 1000 transmits a second input signal IN2 inputted to an input terminal 201 of the second circuit 200, via the insulating transformer 10 and outputs the transmitted signal as a first output signal OUT1 from an output terminal 102 of the first circuit 100, and also outputs a second abnormality signal err2 from an abnormality output terminal 203 of the second circuit 200 through self-diagnosis.

Figure 4:
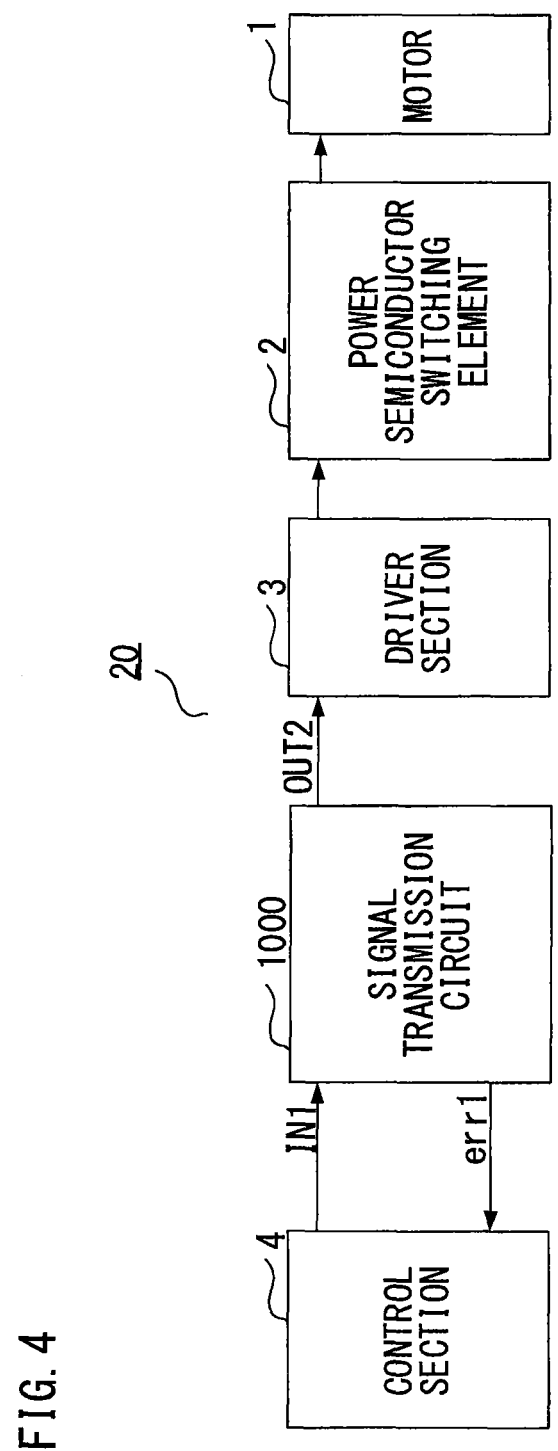
FIG. 4 is a configuration diagram in which the power conversion device according to Embodiment 1 of the present invention is applied to motor control.

Such a signal transmission circuit 1000 is applied to, for example, transmission of a control signal for drive-controlling a power semiconductor switching element 2 within a power conversion device 20 as shown in FIG. 4. In this case, only signal transmission in one direction is illustrated for convenience, but bidirectional signal transmission is enabled.

As shown in FIG. 4, the power conversion device 20 which controls a motor 1 used in a hybrid vehicle, an electric vehicle, or the like includes: the power semiconductor switching element 2; a driver section 3 as a drive circuit which drives the power semiconductor switching element 2; a control section 4 which generates a control signal for controlling the power semiconductor switching element 2; and the signal transmission circuit 1000 which transmits the control signal from the control section 4 to the driver section 3.

The signal transmission circuit 1000 is connected between the control section 4 and the driver section 3 to insulate the power semiconductor switching element 2, the driver section 3, and a device controlled at high voltage, such as the motor 1, from the control section 4, receives the control signal from the control section 4 as the first input signal IN1, outputs the control signal as the second output signal OUT2, and also outputs the first abnormality signal err1 to the control section 4 through self-diagnosis.

The first circuit 100 includes a first transmitting circuit 120, a first receiving circuit 130, a first switching circuit 140 which switches between transmission and reception, a third switching circuit 150 which switches between input and output, a first abnormality detection circuit 160, a first delay circuit 170, and a first direction control section 180.

The first transmitting circuit 120 generates and outputs transmission signals Vr1 and Vf1 to the first coil 110 in accordance with change in a logical value of an inputted signal A, and also outputs a control signal SW1 for controlling the first switching circuit 140. The first receiving circuit 130 receives signals VN1 and VP1 from the first coil 110, demodulates the signals VN1 and VP1 into a binary signal Vrx1 having a logical value, and outputs the binary signal Vrx1. The first switching circuit 140 switches a connection destination of the first coil 110 between the first transmitting circuit 120 and the first receiving circuit 130 on the basis of the control signal SW1 from the first transmitting circuit 120. The first abnormality detection circuit 160 compares the output signal Vrx1 from the first receiving circuit 130 with the signal A inputted to the first transmitting circuit 120, to detect abnormality, and outputs the first abnormality signal err1. The first delay circuit 170 delays the output signal Vrx1 from the first receiving circuit 130 by a predetermined time to generate a delay signal VO1, and outputs the delay signal VO1.

The third switching circuit 150 switches the signal A to be inputted to the first transmitting circuit 120 between the first input signal IN1 and the delay signal VO1 on the basis of the control signal from the first direction control section 180, which controls a signal transmission direction, and outputs the output signal Vrx1 from the first receiving circuit 130 as the first output signal OUT1 during a period when the delay signal VO1 is switched and selected. In addition, the control signal from the first direction control section 180 is also inputted to the first abnormality detection circuit 160 to cause the first abnormality detection circuit 160 to be operable during a period when the first input signal IN1 is switched and selected as the signal A.

The second circuit 200 includes a second transmitting circuit 220, a second receiving circuit 230, a second switching circuit 240 which switches between transmission and reception, a fourth switching circuit 250 which switches between input and output, a second abnormality detection circuit 260, a second delay circuit 270, and a second direction control section 280.

The second transmitting circuit 220 generates and outputs transmission signals Vr2 and Vf2 to the second coil 210 in accordance with change in a logical value of an inputted signal B, and also outputs a control signal SW2 for controlling the second switching circuit 240. The second receiving circuit 230 receives signals VN2 and VP2 from the second coil 210, demodulates the signals VN2 and VP2 into a binary signal Vrx2 having a logical value, and outputs the binary signal Vrx2. The second switching circuit 240 switches a connection destination of the second coil 110 between the second transmitting circuit 220 and the second receiving circuit 230 on the basis of the control signal SW2 from the second transmitting circuit 220. The second abnormality detection circuit 260 compares the output signal Vrx2 from the second receiving circuit 230 with the signal B inputted to the second transmitting circuit 220, to detect abnormality, and outputs the second abnormality signal err2. The second delay circuit 270 delays the output signal Vrx2 from the second receiving circuit 230 by a predetermined time to generate a delay signal VO2, and outputs the delay signal VO2.

The fourth switching circuit 250 switches the signal B to be inputted to the second transmitting circuit 220 between the second input signal IN2 and the delay signal VO2 on the basis of the control signal from the second direction control section 280, which controls a signal transmission direction, and outputs the output signal Vrx2 from the second receiving circuit 230 as the second output signal OUT2 during a period when the delay signal VO2 is switched and selected. In addition, the control signal from the second direction control section 280 is also inputted to the second abnormality detection circuit 260 to cause the second abnormality detection circuit 260 to be operable during a period when the second input signal IN2 is switched and selected as the signal B.

Figure 5:
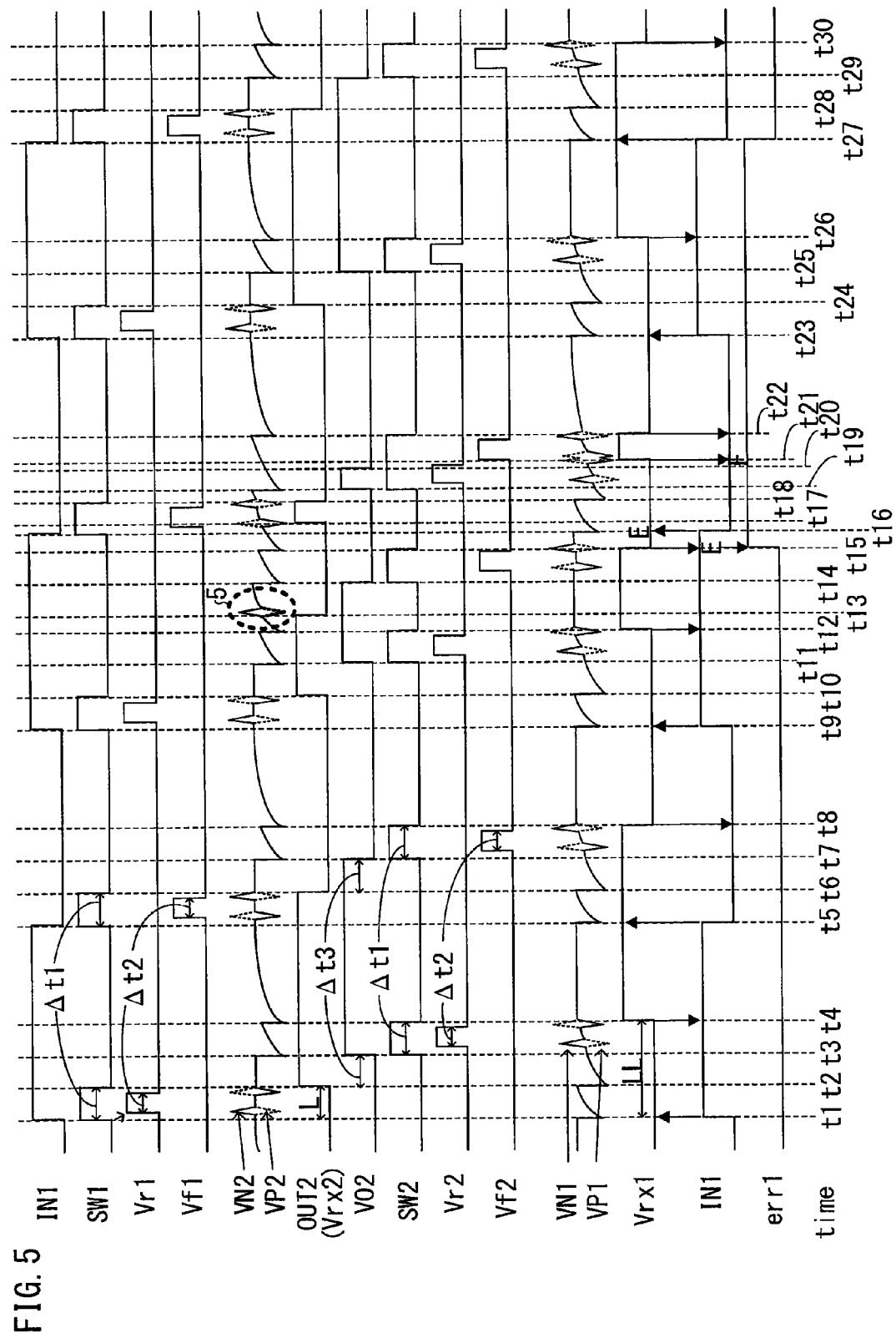
FIG. 5 is a diagram showing an operation waveform of the signal transmission circuit according to Embodiment 1 of the present invention.

FIG. 5 is a diagram showing an operation waveform of the signal transmission circuit 1000. In this case, the case where the first input signal IN1 inputted to the first circuit 100 is transmitted and outputted as the second output signal OUT2 from the second circuit 200 is shown, but the same applies to the case of the opposite direction.

Hereinafter, the detailed configuration and operation of each section of the signal transmission circuit 1000 will be described.

In this case, it is assumed that an external command regarding a signal transmission direction is received, the control signal from the first direction control section 180 is high, and the control signal from the second direction control section 280 is low.

The first transmitting circuit 120 includes a rising edge detection section 121, a falling edge detection section 122, a rising edge detection section 123, a rising edge detection section 124, and an OR circuit 125.

The rising edge detection section 121 and the falling edge detection section 122 detect a rising edge and a falling edge of the input signal A (IN1 in this case) and generate pulse signals having a pulse width $\Delta t1$, respectively, and the first switching circuit 140 is controlled on the basis of a pulse signal (the control signal SW1) which is generated through the OR circuit 125. The rising edge detection sections 123 and 124 detect rising edges of the pulse signals having the pulse width $\Delta t1$ detected by the rising edge detection section 121 and the falling edge detection section 122, respectively, and generate and output pulse signals having a pulse width $\Delta t2$ which are the transmission signals Vr1 and Vf1 to the first coil 110.

Here, in order to assuredly transmit the transmission signals Vr1 and Vf1 to the first coil 110, a relationship between the pulse width $\Delta t2$ of the transmission signals Vr1 and Vf1 and the pulse width $\Delta t1$ of the control signal SW1 is set as $\Delta t1 > \Delta t2$.

The second transmitting circuit 220 is similar to the first transmitting circuit 120, that is, includes a rising edge detection section 221, a falling edge detection section 222, a rising edge detection section 223, a rising edge detection section 224, and an OR circuit 225. The second transmitting circuit 220 generates and outputs the control signal SW2 having the pulse width $\Delta t1$ for controlling the second switching circuit 240, and also generates and outputs pulse signals having the pulse width A t2 which are the transmission signals Vr2 and Vf2 to the second coil 210.

The first receiving circuit 130 receives the signals VN1 and VP1 from the first coil 110, demodulates the signals VN1 and VP1 into the binary signal Vrx1 having a logical value, and outputs the binary signal Vrx1. Similarly, the second receiving circuit 230 receives the signals VN2 and VP2 from the second coil 210, demodulates the signals VN2 and VP2 into the binary signal Vrx2 having a logical value, and outputs the binary signal Vrx2. In this case, the signal Vrx2 is the output signal (second output signal OUT2) from the second circuit 200.

The first switching circuit 140 includes four switches 141 to 144 which are: two switches 141 and 142 which connect a path (transmitting path) for sending the respective transmission signals Vr1 and Vf1 from the first transmitting circuit 120 to respective terminals of the first coil 110; and two switches 143 and 144 which connect a path (receiving path) for receiving the signals VN1 and VP1 from the respective terminals of the first coil 110 by the first receiving circuit 130.

When the control signal SW1 from the first transmitting circuit 120 is high, the two switches 141 and 142 connected to the transmitting path are turned ON, and the two switches 143 and 144 connected to the receiving path are turned OFF. In addition, on the other hand, when the control signal SW1 is low, the two switches 141 and 142 connected to the transmitting path are turned OFF, and the two switches 143 and 144 connected to the receiving path are turned ON.

The second switching circuit 240 is similar to the first switching circuit 140, that is, includes four switches 241 to 244. When the control signal SW2 from the second transmitting circuit 220 is high, the two switches 241 and 242 connected to a transmitting path are turned ON, and the two switches 273 and 274 connected to a receiving path are turned OFF. In addition, on the other hand, when the control signal SW2 is low, the two switches 241 and 242 connected to the transmitting path are turned OFF, and the two switches 243 and 244 connected to the receiving path are turned ON.

The first delay circuit 170 generates and outputs the delay signal VO1 which is obtained by delaying the signal Vrx1 from the first receiving circuit 130 by a set time (delay time $\Delta t3$). Similarly, the second delay circuit 270 generates and outputs the delay signal VO2 which is obtained by delaying the signal Vrx2 from the second receiving circuit 230 (the second output signal OUT2 in this case) by a set time (delay time $\Delta t3$).

Here, a relationship between the delay time $\Delta t3$ and the pulse width $\Delta t1$ of the control signals SW1 and SW2 is set as $\Delta t3 \geq \Delta t1$. Thus, the control signal SW1 and the control signal SW2 do not simultaneously become high, and bidirectional transmission and reception can be assuredly performed by the single insulating transformer 10 which includes a pair of coils, the first coil 110 and the second coil 210.

The first abnormality detection circuit 160 operates on the basis of the control signal of the first direction control section 180 (a high signal in this case), compares the output signal Vrx1 from the first receiving circuit 130 with the signal A (IN1 in this case) inputted to the first transmitting circuit 120, to detect abnormality, and outputs the first abnormality signal err1. When the control signal of the first direction control section 180 becomes low, the first abnormality detection circuit 160 is reset. It is noted that in the waveform diagram of FIG. 3, for facilitating understanding of the comparison between the two types of signals Vrx1 and IN1, the waveform of the signal IN1 shown at the uppermost stage is shown again at the stage next to the signal Vrx1.

Similarly, the second abnormality detection circuit 260 operates on the basis of the control signal of the second direction control section 280, compares the output signal Vrx2 from the second receiving circuit 230 with the signal B inputted to the second transmitting circuit 220, to detect abnormality, and outputs the second abnormality signal err2. In this case, since the control signal of the second direction control section 280 is low, the second abnormality detection circuit 260 does not operate.

The third switching circuit 150 includes three switches 151 to 153 which operate on the basis of the control signal from the first direction control section 180. The switch 151 connects the input terminal 101 of the first circuit 100 and an input of the first transmitting circuit 120, and the switch 152 connects the output terminal 102 of the first circuit 100 and an output of the first receiving circuit 130. In addition, the switch 153 connects an output of the first delay circuit 170 and the input of the first transmitting circuit 120. When the control signal of the first direction control section 180 is high, the switch 151 is turned ON, and the switches 152 and 153 are turned OFF, whereby the first input signal IN1 is inputted as the signal A to an input terminal of the first transmitting circuit 120. In addition, when the control signal of the first direction control section 180 is low, the switch 151 is turned OFF, and the switches 152 and 153 are turned ON, whereby the delay signal VO1 from the first delay circuit 170 is inputted as the signal A to the input terminal of the first transmitting circuit 120, and the output signal Vrx1 of the first receiving circuit 130 is outputted as the first output signal OUT1 from the output terminal 102 of the first circuit 100.

In this case, the control signal of the first direction control section 180 is high, thus the first input signal IN1 is inputted as the signal A to the first transmitting circuit 120, and the output terminal 102 becomes open at that time.

The fourth switching circuit 250 is similar to the third switching circuit 150, that is, includes three switches 251 to 253 which operate on the basis of the control signal from the second direction control section 280. When the control signal of the second direction control section 280 is high, the switch 251 is turned ON, and the second input signal IN2 is inputted as the signal B to an input terminal of the second transmitting circuit 220. In addition, when the control signal of the second direction control section 280 is low, the switches 252 and 253 are turned ON, the delay signal VO2 from the second delay circuit 270 is inputted as the signal B to the second transmitting circuit 220, and the output signal Vrx2 of the second receiving circuit 230 is outputted as the second output signal OUT2 from the output terminal 202 of the second circuit 200.

In this case, the control signal of the second direction control section 280 is low, thus the input terminal 201 is open, the delay signal VO2 from the second delay circuit 270 is inputted as the signal B to the second transmitting circuit 220, and the output signal Vrx2 of the second receiving circuit 230 is outputted as the second output signal OUT2 from the output terminal 202 of the second circuit 200.

Next, the configuration and operation of each section within the first transmitting circuit 120 will be described. It is noted that the configuration and operation of each section of the second transmitting circuit 220 are the same as those of the first transmitting circuit 120, and thus the description thereof is omitted.

Figure 6:
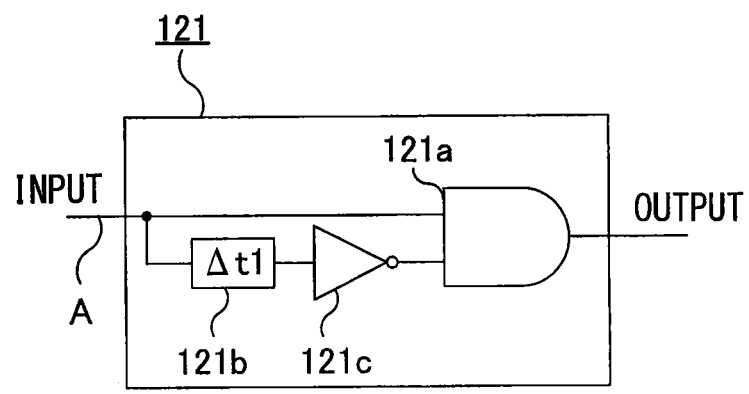
FIG. 6 is a diagram showing the circuit configuration of a rising edge detection section within a transmitting circuit according to Embodiment 1 of the present invention.
Figure 7:
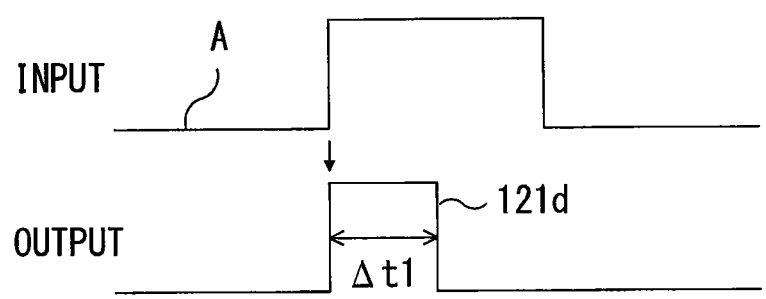
FIG. 7 is a diagram showing an operation waveform of the rising edge detection section within the transmitting circuit according to Embodiment 1 of the present invention.

FIG. 6 is a circuit diagram showing the configuration of the rising edge detection section 121 within the first transmitting circuit 120, and FIG. 7 shows an operation waveform of the rising edge detection section 121. It is noted that the configuration of the rising edge detection section 121 shown in FIG. 6 is an example, and the configuration of the rising edge detection section 121 is not limited thereto.

As shown in FIG. 6, the rising edge detection section 121 includes an AND circuit 121a, a delay circuit 121b, and an inverter 121c. An input of the rising edge detection section 121 (the signal A) is inputted to one input terminal of the AND circuit 121a and also inputted to the delay circuit 121b. An output of the delay circuit 121b is inputted via the inverter 121c to the other input terminal of the AND circuit 121a. It is noted that a delay time between an input signal and an output signal of the delay circuit 121b is set as $\Delta t1$.

Therefore, as shown in FIG. 7, in the rising edge detection section 121, when the input signal A changes from low to high, a first edge detection signal 121d which is at a high level over a period $\Delta t1$ is outputted accordingly.

The other rising edge detection sections 123 and 124 within the first transmitting circuit 120 have the same circuit configuration as that of the rising edge detection section 121 described above, but the delay times of their delay circuits are set as $\Delta t2$ ($<\Delta t1$).

Figure 8:
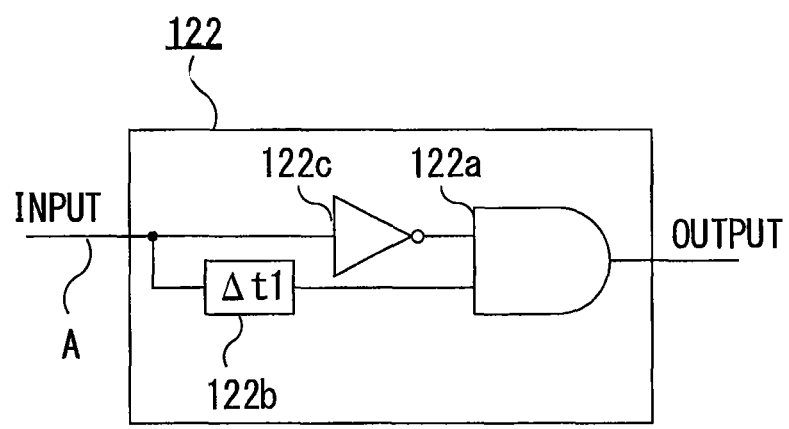
FIG. 8 is a diagram showing the circuit configuration of a falling edge detection section within the transmitting circuit according to Embodiment 1 of the present invention.
Figure 9:
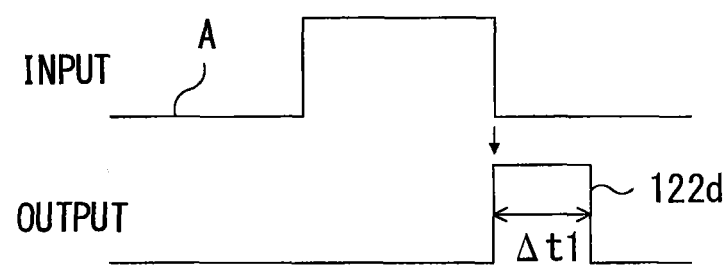
FIG. 9 is a diagram showing an operation waveform of the falling edge detection section within the transmitting circuit according to Embodiment 1 of the present invention.

FIG. 8 is a circuit diagram showing the configuration of the falling edge detection section 122 within the first transmitting circuit 120, and FIG. 9 shows an operation waveform of the falling edge detection section 122. It is noted that the configuration of the falling edge detection section 122 shown in FIG. 8 is an example, and the configuration of the falling edge detection section 122 is not limited thereto.

As shown in FIG. 8, the falling edge detection section 122 includes an AND circuit 122a, a delay circuit 122b, and an inverter 122c. An input of the falling edge detection section 122 (the signal A) is inputted via the inverter 122c to one input terminal of the AND circuit 122a, and also inputted via the delay circuit 122b to the other input terminal of the AND circuit 122a. It is noted that a delay time between an input signal and an output signal of the delay circuit 122b is set as $\Delta t1$ which is equal to the delay time of the delay circuit 121b within the rising edge detection section 121.

Therefore, as shown in FIG. 9, in the falling edge detection section 122, when the input signal A changes from high to low, a first edge detection signal 122d which is at a high level over a period $\Delta t1$ is outputted accordingly.

It is noted that the high level signals having a period $\Delta t1$ which are outputted by the rising edge detection section 221 and the falling edge detection section 222 of the second transmitting circuit 220 are referred to as second edge detection signals.

The control signal SW1 outputted from the first transmitting circuit 120 to the first switching circuit 140 is an output of two types of the first edge detection signals 121d and 122d via the OR circuit 125, and the control signal SW2 outputted from the second transmitting circuit 220 to the second switching circuit 240 is an output of two types of the second edge detection signals via the OR circuit 225.

Next, the detailed configuration and operation of the first abnormality detection circuit 160 will be described. It is noted that the detailed configuration and operation of the second abnormality detection circuit 260 are the same as those of the first abnormality detection circuit 160, and thus the description thereof is omitted.

Figure 10:
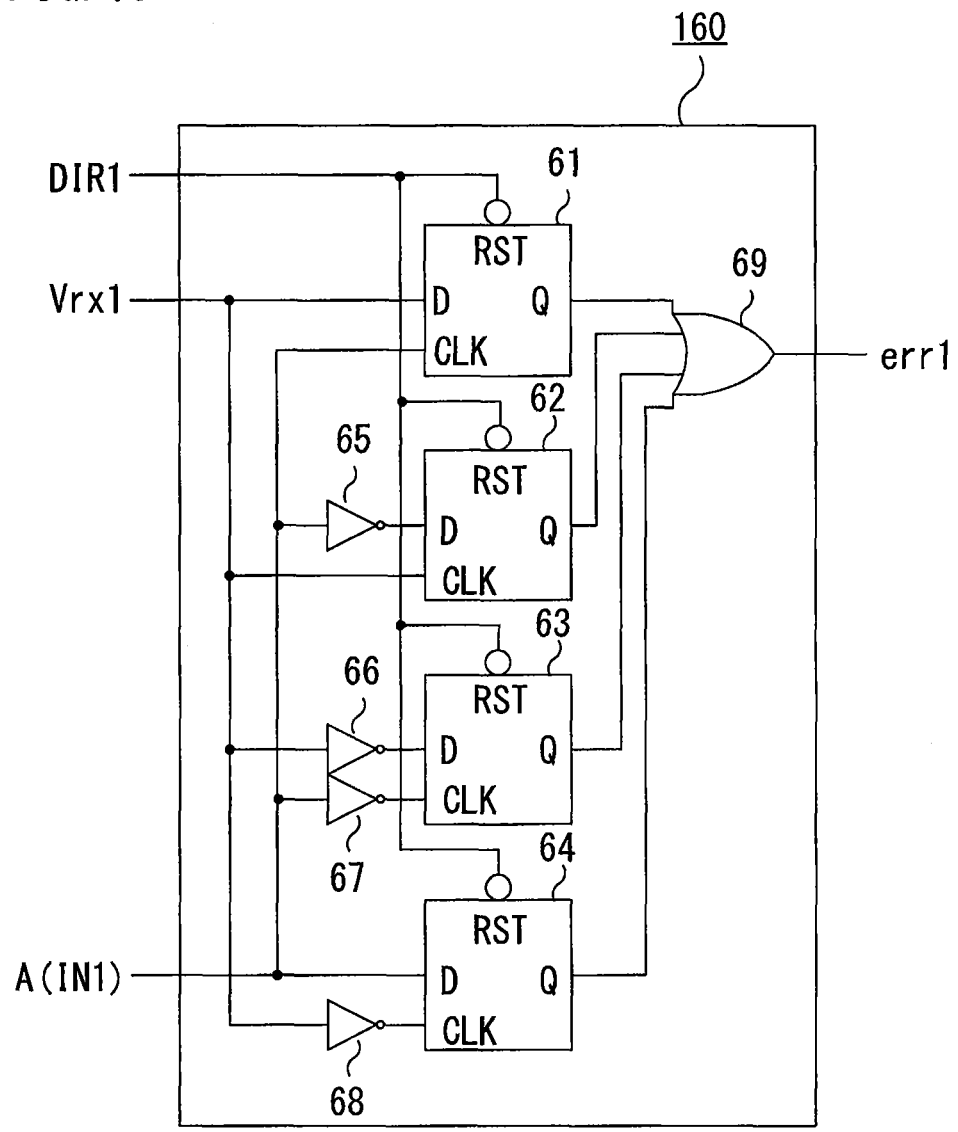
FIG. 10 is a diagram showing the circuit configuration of an abnormality detection circuit according to Embodiment 1 of the present invention.
Figure 11:
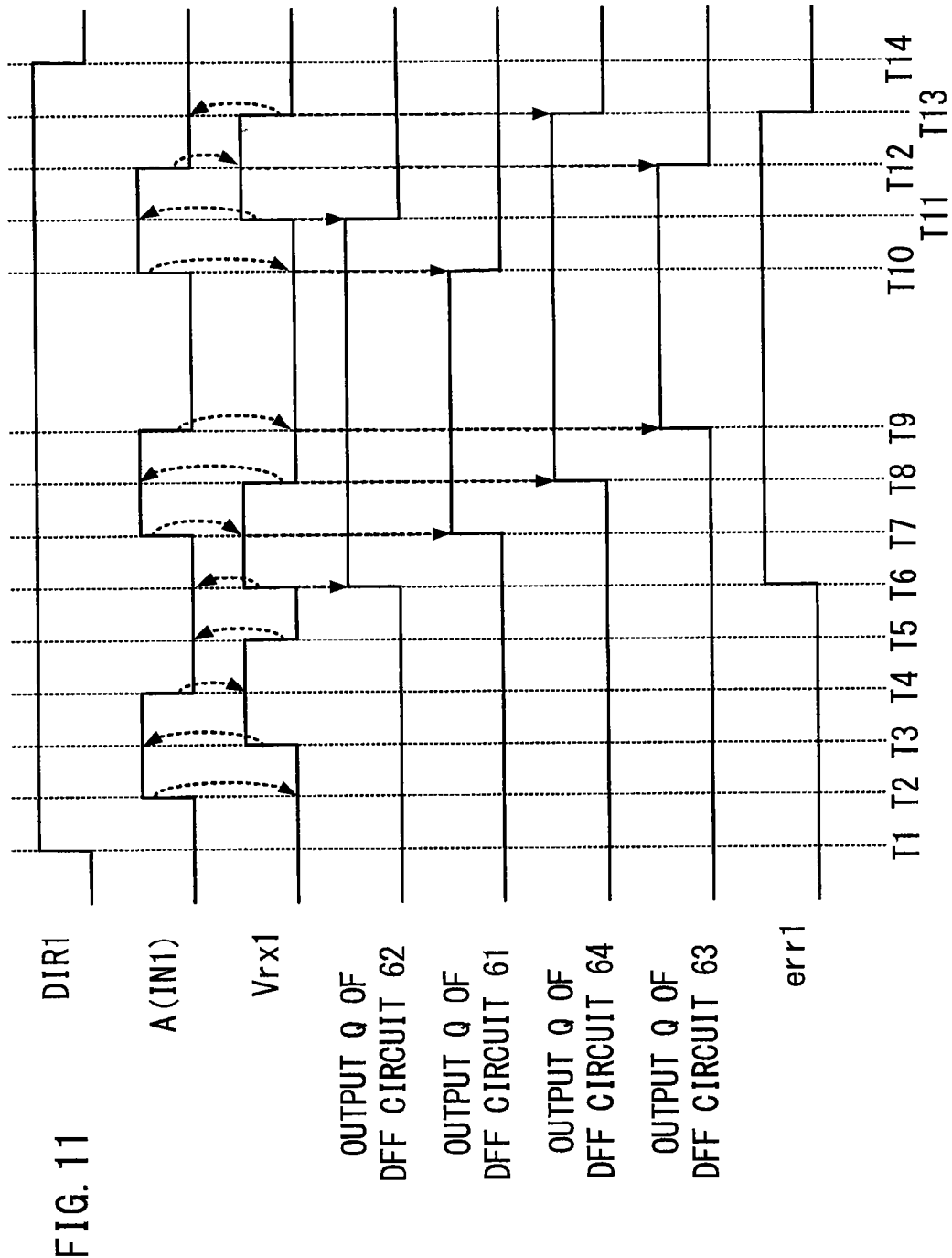
FIG. 11 is a diagram showing an operation waveform of the abnormality detection circuit according to Embodiment 1 of the present invention.

FIG. 10 is a circuit diagram showing the configuration of the first abnormality detection circuit 160, and FIG. 11 shows an operation waveform of each section of the first abnormality detection circuit 160. It is noted that the configuration of the first abnormality detection circuit 160 shown in FIG. 10 is an example, and the configuration of the first abnormality detection circuit 160 is not limited thereto.

As shown in FIG. 10, the first abnormality detection circuit 160 includes four data flip-flop circuits (hereinafter, referred to as DFF circuits) 61 to 64, four inverters 65 to 68, and an OR circuit 69, and an output of the OR circuit 69 is an output of the first abnormality detection circuit 160 (the first abnormality signal err1).

An output of the first direction control section 180 is connected to a reset terminal RST of each of the DFF circuits 61 to 64, and output terminals Q of the respective DFF circuits 61 to 64 are connected to four input terminals of the OR circuit 69, respectively.

In addition, the output of the first receiving circuit 130 (the signal Vrx1) is connected to a data terminal D of the DFF circuit 61, and the input of the first transmitting circuit 120 (the signal A) is connected to a clock terminal CLK of the DFF circuit 61. The input of the first transmitting circuit 120 (the signal A) is connected via the inverter 65 to a data terminal D of the DFF circuit 62, and the output of the first receiving circuit 130 (the signal Vrx1) is connected to a clock terminal CLK of the DFF circuit 62. The output of the first receiving circuit 130 (the signal Vrx1) is connected via the inverter 66 to a data terminal D of the DFF circuit 63, and the input of the first transmitting circuit 120 (the signal A) is connected via the inverter 37 to a clock terminal CLK of the DFF circuit 63. The input of the first transmitting circuit 120 (the signal A) is connected to a data terminal D of the DFF circuit 64, and the output of the first receiving circuit 130 (the signal Vrx1) is connected via the inverter 68 to a clock terminal CLK of the DFF circuit 64.

In the first abnormality detection circuit 160 configured as described above, as shown in FIG. 11, a state at rising and falling of each of the input signal A of the first transmitting circuit 120 and the output signal Vrx1 of the first receiving circuit 130 is monitored, abnormality of the signal A or the signal Vrx1 is outputted as an error signal from each of the DFF circuits 61 to 64. Since the first abnormality detection circuit 160 operates when the control signal from the first direction control section 180 is high, the signal A inputted to the first abnormality detection circuit 160 is the first input signal IN1. When no abnormality is present in the signal A and the signal Vrx1, a signal obtained by delaying the signal A with the same waveform is the signal Vrx1.

As shown in FIG. 11, the states of the signal A and the signal Vrx1 are normal during a period of times T1 to T5, and abnormality occurs during a period of times T6 to T9. At and after time T10, the states of the signal A and the signal Vrx1 return to normal, but a period of times T10 to T13 is an abnormality elimination period taken to cancel the error signal of each of the DFF circuits 61 to 64, and the first abnormality signal err1 is high during a period of times T6 to T13. It is noted that FIG. 11 is a waveform diagram for describing an operation of the first abnormality detection circuit 160, and is unrelated to the states of the signal A (IN1), the signal Vrx1, and the signal err1 shown in FIG. 5.

At time T1, the control signal of the first direction control section 180 shifts from low to high, and each of the DFF circuits 61 to 64 becomes operable.

When the signal A shifts from low to high at time T2, the signal Vrx1 is low, and the output Q of the DFF circuit 61 is kept low.

When the signal Vrx1 shifts from low to high at time T3, the signal A is high, and the output Q of the DFF circuit 62 is kept low.

When the signal A shifts from high to low at time T4, the signal Vrx1 is high, and the output Q of the DFF circuit 63 is kept low.

When the signal Vrx1 shifts from high to low at time T5, the signal A is low, and the output Q of the DFF circuit 64 is kept low.

At time T6, the signal Vrx1 shifts from low to high. At that time, since the signal A is low, the output Q of the DFF circuit 62 shifts from low to high, and the first abnormality signal err1 becomes high.

When the signal A shifts from low to high at time T7, the signal Vrx1 is high, and the output Q of the DFF circuit 61 shifts from low to high.

When the signal Vrx1 shifts from high to low at time T8, the signal A is high, and the output Q of the DFF circuit 64 shifts from low to high.

When the signal A shifts from high to low at time T9, the signal Vrx1 is low, and the output Q of the DFF circuit 63 shifts from low to high.

When the signal A shifts from low to high at time T10, the signal Vrx1 is low, and the output Q of the DFF circuit 61 shifts from high to low.

When the signal Vrx1 shifts from low to high at time T11, the signal A is low, and the output Q of the DFF circuit 62 shifts from high to low.

When the signal A shifts from high to low at time T12, the signal Vrx1 is low, and the output Q of the DFF circuit 63 shifts from high to low.

When the signal Vrx1 shifts from high to low at time T13, the signal A is low, and the output Q of the DFF circuit 64 shifts from high to low. Thus, all the outputs Q of the DFF circuits 61 to 64 become low, and the first abnormality signal err1 which is the output of the OR circuit 69 becomes low.

At time T14, the control signal of the first direction control section 180 shifts from high to low, and all the outputs of the respective DFF circuits 61 to 64 forcibly become low.

As described above, in the first abnormality detection circuit 160, the state at rising and falling of each of the input signal A of the first transmitting circuit 120 and the output signal Vrx1 of the first receiving circuit 130 is monitored. When abnormality occurs in the signal A and the signal Vrx1, the first abnormality signal err1 is caused to become high and is outputted. In addition, when abnormality is detected, the first abnormality signal err1 is kept high until abnormality is eliminated in each state at rising or falling of each of the signal A and the signal Vrx1.

Next, the detailed configuration and operation of the first receiving circuit 130 will be described. It is noted that the detailed configuration and operation of the second receiving circuit 230 are the same as those of the first receiving circuit 130, and thus the description thereof is omitted.

Figure 12:
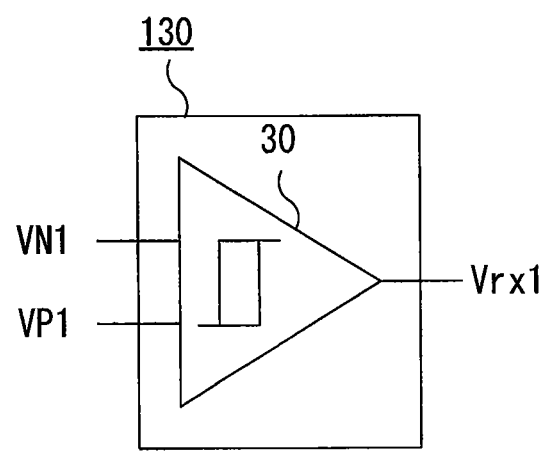
FIG. 12 is a diagram showing the circuit configuration of a receiving circuit according to Embodiment 1 of the present invention.

FIG. 12 is a circuit diagram showing the configuration of the first receiving circuit 130. The configuration shown here is an example, and the configuration of the first receiving circuit 130 is not limited thereto.

As shown in FIG. 12, the first receiving circuit 130 includes a hysteresis comparator 30, and has hysteresis characteristics in which an output level is inverted when the difference between the inputted signals VN1 and VP1 exceeds a predetermined threshold. The first receiving circuit 130 demodulates the signals VN1 and VP1 from the first coil 110 into the binary signal Vrx1 having a logical value, and outputs the binary signal Vrx1.

Next, an operation of the entire signal transmission circuit 1000 will be described with reference to FIG. 5. As described above, the control signal of the first direction control section 180 is high, the control signal of the second direction control section 280 is low, and the first input signal IN1 inputted to the first circuit 100 is transmitted and outputted as the second output signal OUT2 from the second circuit 200.

FIG. 5 shows operation waveforms of: the first input signal IN1 (the input signal A of the first transmitting circuit 120); the control signal SW1 outputted from the first transmitting circuit 120 to the first switching circuit 140; the transmission signals Vr1 and Vf1 transmitted from the first transmitting circuit 120 to a first end and a second end of the first coil 110, respectively; the signals VN2 and VP2 generated at a first end and a second end of the second coil 210 and received by the second receiving circuit 230; the second output signal OUT2 (the output signal Vrx2 of the second receiving circuit 230); the delay signal VO2 from the second delay circuit 270; the control signal SW2 outputted from the second transmitting circuit 220 to the second switching circuit 240; the transmission signals Vr2 and Vf2 transmitted from the second transmitting circuit 220 to the first end and the second end of the second coil 210, respectively; the signals VN1 and VP1 generated at the first end and the second end of the first coil 110 and received by the first receiving circuit 130; the output signal Vrx1 of the first receiving circuit 130; and the first abnormality signal err1 outputted from the first abnormality detection circuit 160.

In a normal state, the second output signal OUT2 which is generated by delaying the inputted first input signal IN1 by a predetermined period L (≤Δt1) with the same waveform is outputted. Then, the signal Vrx1 is generated by delaying the delay signal VO2, which is obtained by delaying the second output signal OUT2 by a period Δt3, further by a predetermined period L (≤Δt1) with the same waveform, and the signal Vrx1 and the first input signal IN1 are compared with each other to detect abnormality. In a normal state, the signal Vrx1 is a signal obtained by delaying the first input signal IN1 by a period LL (≤2(Δt1)+Δt3) with the same waveform. Normally, the period LL is a period which is substantially equal to or slightly shorter than (2(Δt1)+Δt3).

As shown in FIG. 5, when noise 5 occurs in the signals VN2 and VP2 from the second coil 210 at time t13, the second output signal OUT2 becomes abnormal due to the noise 5, and the first abnormality signal err1 is high during a period of times t15 to t27. At and after time t22, each signal waveform returns to normal, but a period of times t22 to t27 is an abnormality elimination period.

At time t1, the first input signal IN1 shifts from low to high. The first input signal IN1 is inputted to the first transmitting circuit 120 and the first abnormality detection circuit 160. In the first abnormality detection circuit 160, when the first input signal IN1 shifts from low to high, the output signal Vrx1 of the first receiving circuit 130 is low, and thus the output of the first abnormality detection circuit 160 (the first abnormality signal err1) is kept low. In addition, in the first transmitting circuit 120, when the first input signal IN1 shifts from low to high, a signal SW1 which is at a high level over a period Δt1 is generated by using the rising edge detection section 121 and the OR circuit 125.

The high signal SW1 having a period Δt1 turns ON the two switches 141 and 142 which connect the transmitting path within the first switching circuit 140, and turns OFF the two switches 143 and 144 which connect the receiving path within the first switching circuit 140. In addition, a high signal (first edge detection signal 121d) having a period Δt1 which is an output of the rising edge detection section 121 is inputted to the rising edge detection section 123, and a signal Vr1 which is at a high level over a period Δt2 is generated. The signal Vr1 is inputted to the first end of the first coil 110, causing current change in the first coil 110 in accordance with change in the logical value of the input signal Vr1. In the second coil 210, induced voltage signals VN2 and VP2 of bipolar double pulses are induced by the current change of the first coil 110 and outputted.

During the high signal SW1 having a period Δt1, the signal SW2 for controlling the second switching circuit 240 within the second circuit 200 is low, the two switches 241 and 242 which connect the transmitting path within the second switching circuit 240 are turned OFF, and the two switches 243 and 244 which connect the receiving path within the second switching circuit 240 are turned ON. The induced voltage signals VN2 and VP2 outputted from the second coil 210 are inputted to respective input terminals of the second receiving circuit 230.

At time t2, when the difference between the signals VN2 and VP2 received by the second receiving circuit 230 becomes greater than a set threshold of the second receiving circuit 230, that is, the difference between the second pulses of the induced voltage signals VN2 and VP2 of the bipolar double pulses becomes greater than the threshold of the second receiving circuit 230, the output signal Vrx2 of the second receiving circuit 230 is inverted to be high, and is outputted as the second output signal OUT2. Here, the control signal of the second direction control section 280 is low, thus the switch 251 within the fourth switching circuit 250 is turned OFF, the switches 252 and 253 are turned ON, and the second abnormality detection circuit 260 is in a reset state. That is, when the control signal of the second direction control section 280 is low, the output signal Vrx2 of the second receiving circuit 230 is outputted as the second output signal OUT2, and the delay signal VO2 of the second delay circuit 270 is inputted as the signal B to the second transmitting circuit 220. It is noted that although time t2 overlaps time t1+Δt1 in FIG. 5, time t2 at which the signal Vrx2 becomes high is between time (t1+Δt2) and time (t1+Δt1).

At time t3, the signal VO2 which is obtained by delaying the output signal Vrx2 of the second receiving circuit 230 by a period Δt3 using the second delay circuit 270 shifts from low to high. The delay signal VO2 is inputted to the second transmitting circuit 220, and in the second transmitting circuit 220, when the delay signal VO2 shifts from low to high, a signal SW2 which is at a high level over a period Δt1 is generated by using the rising edge detection section 221 and the OR circuit 225.

The high signal SW2 having a period Δt1 turns ON the two switches 241 and 242 which connect the transmitting path within the second switching circuit 240, and turns OFF the two switches 243 and 244 which connect the receiving path within the second switching circuit 240. In addition, a high signal (second edge detection signal) having a period Δt1 which is an output of the rising edge detection section 221 is inputted to the rising edge detection section 223, and a signal Vr2 which is at a high level over a period Δt2 is generated. The signal Vr2 is inputted to the first end of the second coil 210, causing current change in the second coil 210 in accordance with change in the logical value of the input signal Vr2. In the first coil 110, induced voltage signals VN1 and VP1 of bipolar double pulses are induced by the current change of the second coil 210 and outputted.

During the high signal SW2 having a period Δt1, the signal SW1 for controlling the first switching circuit 140 within the first circuit 100 is low, the two switches 141 and 142 which connect the transmitting path within the first switching circuit 140 are turned OFF, and the two switches 143 and 144 which connect the receiving path within the first switching circuit 140 are turned ON. The induced voltage signals VN1 and VP1 outputted from the first coil 110 are inputted to respective input terminals of the first receiving circuit 130.

At time t4, when the difference between the signals VN1 and VP1 received by the first receiving circuit 130 becomes greater than a set threshold of the first receiving circuit 130, that is, the difference between the second pulses of the induced voltage signals VN1 and VP1 of the bipolar double pulses becomes greater than the threshold of the first receiving circuit 130, the output signal Vrx1 of the first receiving circuit 130 is inverted to be high, and is inputted to the first abnormality detection circuit 160. In addition, when the output signal Vrx1 of the first receiving circuit 130 shifts from low to high, the first input signal IN1 which is an input signal to the first transmitting circuit 120 is high, and thus the output of the first abnormality detection circuit 160 (the first abnormality signal err1) is kept low. It is noted that although time t4 overlaps time t3+Δt1 in FIG. 5, time t4 at which the signal Vrx1 becomes high is between time (t3+Δt2) and time (t3+Δt1). Hereinafter, similarly, for convenience, the timings when the signals SW1 and SW2 become low are shown so as to coincide with timings immediately before which the signals Vrx1 and Vrx2 change.

At time t5, the first input signal IN1 shifts from high to low, and is inputted to the first transmitting circuit 120 and the first abnormality detection circuit 160. In the first abnormality detection circuit 160, when the first input signal IN1 shifts from high to low, the output signal Vrx1 of the first receiving circuit 130 is high, and thus the output of the first abnormality detection circuit 160 (the first abnormality signal err1) is kept low. In addition, in the first transmitting circuit 120, when the first input signal IN1 shifts from high to low, a signal SW1 which is at a high level over a period Δt1 is generated by using the falling edge detection section 122 and the OR circuit 125.

The high signal SW1 having a period Δt1 turns ON the two switches 141 and 142 which connect the transmitting path within the first switching circuit 140, and turns OFF the two switches 143 and 144 which connect the receiving path within the first switching circuit 140. In addition, a high signal (first edge detection signal 122d) having a period Δ t1 which is an output of the falling edge detection section 122 is inputted to the rising edge detection section 124, and a signal Vf1 which is at a high level over a period Δt2 is generated. The signal Vf1 is inputted to the second end of the first coil 110, causing current change in the first coil 110 in accordance with change in the logical value of the input signal Vf1. It is noted that the current change of the first coil 110 at time t5 has polarity opposite to that of the current change of the first coil 110 at time t1. In the second coil 210, induced voltage signals VN2 and VP2 of bipolar double pulses are induced by the current change of the first coil 110 and outputted. Here, the induced voltage signals VN2 and VP2 of the bipolar double pulses of the second coil 210 have polarity opposite to that of the induced voltage signals VN2 and VP2 of the bipolar double pulses of the second coil 210 at time t1.

During the high signal SW1 having a period Δt1, the signal SW2 for controlling the second switching circuit 240 within the second circuit 200 is low, the two switches 241 and 242 which connect the transmitting path within the second switching circuit 240 are turned OFF, and the two switches 243 and 244 which connect the receiving path within the second switching circuit 240 are turned ON. The induced voltage signals VN2 and VP2 outputted from the second coil 210 are inputted to the respective input terminals of the second receiving circuit 230.

At time t6, when the difference between the signals VN2 and VP2 received by the second receiving circuit 230 becomes greater than the set threshold of the second receiving circuit 230, that is, the difference between the second pulses of the induced voltage signals VN2 and VP2 of the bipolar double pulses becomes greater than the threshold of the second receiving circuit 230, the output signal Vrx2 of the second receiving circuit 230 is inverted to be low, and is outputted as the second output signal OUT2.

At time t7, the signal VO2 which is obtained by delaying the output signal Vrx2 of the second receiving circuit 230 by the period Δt3 using the second delay circuit 270 shifts from high to low. The delay signal VO2 is inputted to the second transmitting circuit 220, and in the second transmitting circuit 220, when the delay signal VO2 shifts from high to low, a signal SW2 which is at a high level over a period Δt1 is generated by using the falling edge detection section 222 and the OR circuit 225.

The high signal SW2 having a period Δt1 turns ON the two switches 241 and 242 which connect the transmitting path within the second switching circuit 240, and turns OFF the two switches 243 and 244 which connect the receiving path within the second switching circuit 240. In addition, a high signal (edge detection signal) having a period Δt1 which is an output of the falling edge detection section 222 is inputted to the rising edge detection section 224, and a signal Vf2 which is at a high level over a period Δt2 is generated. The signal Vf2 is inputted to the second end of the second coil 210, causing current change in the second coil 210. In the first coil 110, induced voltage signals VN1 and VP1 of bipolar double pulses are induced by the current change of the second coil 210 and outputted. It is noted that the induced voltage signals VN1 and VP1 of the bipolar double pulses at time t7 have polarity opposite to that of the induced voltage signal VN1 and VP1 of the bipolar double pulses at time t3.

During the high signal SW2 having a period Δt1, the signal SW1 for controlling the first switching circuit 140 within the first circuit 100 is low, the two switches 141 and 142 which connect the transmitting path within the first switching circuit 140 are turned OFF, and the two switches 143 and 144 which connect the receiving path within the first switching circuit 140 are turned ON. The induced voltage signals VN1 and VP1 outputted from the first coil 110 are inputted to the respective input terminals of the first receiving circuit 130.

At time t8, when the difference between the signals VN1 and VP1 received by the first receiving circuit 130 becomes greater than the set threshold of the first receiving circuit 130, that is, the difference between the second pulses of the induced voltage signals VN1 and VP1 of the bipolar double pulses becomes greater than the threshold of the first receiving circuit 130, the output signal Vrx1 of the first receiving circuit 130 is inverted to be low, and is inputted to the first abnormality detection circuit 160. In addition, when the output signal Vrx1 of the first receiving circuit 130 shifts from high to low, the first input signal IN1 which is an input signal to the first transmitting circuit 120 is low, and thus the output of the first abnormality detection circuit 160 (the first abnormality signal err1) is kept low.

From time t9 to time t12, the operation is the same as that from time t1 to time t4.

At time t13, when the signal SW2 for controlling the second switching circuit 240 within the second circuit 200 is low, the noise 5 occurs in the signals VN2 and VP2 from the second coil 210, and is inputted to the second receiving circuit 230. In this case, the noise 5 occurs with a relationship of VN2>VP2, the difference between the signals VN2 and VP2 becomes greater than the threshold of the second receiving circuit 230, and the output signal Vrx2 of the second receiving circuit 230 is inverted to be low, and is outputted as the second output signal OUT2.

At time t14, the signal VO2 which is obtained by delaying the output signal Vrx2 of the second receiving circuit 230 by the period $\Delta t3$ using the second delay circuit 270 shifts from high to low. The delay signal VO2 is inputted to the second transmitting circuit 220, and in the second transmitting circuit 220, when the delay signal VO2 shifts from high to low, a signal SW2 which is at a high level over a period $\Delta t1$ is generated by using the falling edge detection section 222 and the OR circuit 225.

The high signal SW2 having a period $\Delta t1$ turns ON the two switches 241 and 242 which connect the transmitting path within the second switching circuit 240, and turns OFF the two switches 243 and 244 which connect the receiving path within the second switching circuit 240. In addition, a high signal (second edge detection signal) having a period $\Delta t1$ which is an output of the falling edge detection section 222 is inputted to the rising edge detection section 224, and a signal Vf2 which is at a high level over a period $\Delta t2$ is generated. The signal Vf2 is inputted to the second end of the second coil 210, causing current change in the second coil 210. In the first coil 110, induced voltage signals VN1 and VP1 of bipolar double pulses are induced by the current change of the second coil 210 and outputted.

During the high signal SW2 having a period $\Delta t1$, the signal SW1 for controlling the first switching circuit 140 within the first circuit 100 is low, the two switches 141 and 142 which connect the transmitting path within the first switching circuit 140 are turned OFF, and the two switches 143 and 144 which connect the receiving path within the first switching circuit 140 are turned ON. The induced voltage signals VN1 and VP1 outputted from the first coil 110 are inputted to the respective input terminals of the first receiving circuit 130.

At time t15, when the difference between the signals VN1 and VP1 received by the first receiving circuit 130 becomes greater than the set threshold of the first receiving circuit 130, that is, the difference between the second pulses of the induced voltage signals VN1 and VP1 of the bipolar double pulses becomes greater than the threshold of the first receiving circuit 130, the output signal Vrx1 of the first receiving circuit 130 is inverted to be low, and is inputted to the first abnormality detection circuit 160. In addition, when the output signal Vrx1 of the first receiving circuit 130 shifts from high to low, the first input signal IN1 which is an input signal to the first transmitting circuit 120 is high, and thus the first abnormality detection circuit 160 determines that abnormality has occurred, and shifts its output (the first abnormality signal err1) from low to high. The case where occurrence of abnormality is determined is shown by E in FIG. 5.

At time t16, the first input signal IN1 shifts from high to low, and is inputted to the first transmitting circuit 120 and the first abnormality detection circuit 160. In the first abnormality detection circuit 160, when the first input signal IN1 shifts from high to low, the output signal Vrx1 of the first receiving circuit 130 is low, and thus the first abnormality detection circuit 160 determines that abnormality has occurred, and keeps its output (the first abnormality signal err1) high. In addition, in the first transmitting circuit 120, when the first input signal IN1 shifts from high to low, a signal SW1 which is at a high level over a period $\Delta t1$ is generated by using the falling edge detection section 122 and the OR circuit 125, and signals Vf1, VN2, and VP2 are generated with the same waveforms by the same operation as described for time t5.

At time t17, when the difference between the first pulses of the induced voltage signals VN2 and VP2 of the bipolar double pulses which are received by the second receiving circuit 230 when the first input signal IN1 shifts from high to low at time t16 becomes greater than the threshold of the second receiving circuit 230, the output signal Vrx2 of the second receiving circuit 230 is inverted to be high, and is outputted as the second output signal OUT2.

From time t1 to time t12, when the difference between the second pulses of the induced voltage signals VN2 and VP2 of the bipolar double pulses becomes greater than the threshold of the second receiving circuit 230, the output signal Vrx2 of the second receiving circuit 230 is inverted. However, the polarity of the output signal Vrx2 of the second receiving circuit 230 is inverted by the noise 5 which has occurred in VN2 and VP2 at time t13, and thus, here, the polarity of the output signal Vrx2 is inverted by the first pulses of the induced voltage signals VN2 and VP2.

At time t18, when the difference between the second pulses of the induced voltage signals VN2 and VP2 of the bipolar double pulses which are received by the second receiving circuit 230 when the first input signal IN1 shifts from high to low at time t16 becomes greater than the threshold of the second receiving circuit 230, the output signal Vrx2 of the second receiving circuit 230 is inverted to be low, and is outputted as the second output signal OUT2. The period when the signal Vrx2 (second output signal OUT2) that becomes low at that time is high is shorter than the period $\Delta t1$.

At time t19, the signal VO2 which is obtained by delaying the output signal Vrx2 of the second receiving circuit 230 by the period $\Delta t3$ using the second delay circuit 270 shifts from low to high. The delay signal VO2 is inputted to the second transmitting circuit 220, and in the second transmitting circuit 220, when the delay signal VO2 shifts from low to high, a signal SW2 which is at a high level over a period $\Delta t1$ is generated by using the rising edge detection section 221 and the OR circuit 225. In addition, a period when the delay signal VO2 is high is shorter than the period $\Delta t1$ which is set in the rising edge detection section 221 of the second transmitting circuit 220. Thus, during the signal SW2 having a period $\Delta t1$, the delay signal VO2 becomes low (at time t20), and a signal SW2 which is at a high level over a period $\Delta t1$ is further generated by the falling edge detection section 222 and the OR circuit 225. That is, a period when the signal SW2 is at a high level becomes longer than $\Delta t1$.

The high signal SW2 turns ON the two switches 241 and 242 which connect the transmitting path within the second switching circuit 240, and turns OFF the two switches 243 and 244 which connect the receiving path within the second switching circuit 240. In addition, a high signal (second edge detection signal) having a period $\Delta t1$ which is an output of the rising edge detection section 221 is inputted to the rising edge detection section 224, and a signal Vr2 which is at a high level over a period $\Delta t2$ is generated. The signal Vr2 is inputted to the first end of the second coil 210, causing current change in the second coil 210. In the first coil 110, induced voltage signals VN1 and VP1 of bipolar double pulses are induced by the current change of the second coil 210 and outputted.

At time t20, the delay signal VO2 inputted to the second transmitting circuit 220 as described above shifts from high to low, the signal generated by the falling edge detection section 222 of the second transmitting circuit 220 is inputted to the rising edge detection section 224, and a signal Vf2 which is at a high level over a period Δt2 is generated. The signal Vf2 is inputted to the second end of the second coil 110, causing current change in the second coil 210. In the first coil 110, induced voltage signals VN1 and VP1 of bipolar double pulses are induced by the current change of the second coil 210 and outputted.

At time t21, when the difference between the second pulses of the induced voltage signals VN1 and VP1 of the bipolar double pulses generated on the basis of the signal Vr2 becomes greater than the threshold of the first receiving circuit 130, the output signal Vrx1 of the first receiving circuit 130 is inverted to be high, and is inputted to the first abnormality detection circuit 160. In addition, when the output signal Vrx1 of the first receiving circuit 130 shifts from low to high, the first input signal IN1 which is an input to the first transmitting circuit 120 is low, and thus the first abnormality detection circuit 160 determines that abnormality has occurred, and keeps its output (the first abnormality signal err1) high.

At time t22, when the difference between the second pulses of the induced voltage signals VN1 and VP1 of the bipolar double pulses which are generated on the basis of the signal Vf2 becomes greater than the threshold of the first receiving circuit 130, the output signal Vrx1 of the first receiving circuit 130 is inverted to be low, and is inputted to the first abnormality detection circuit 160. In addition, when the output signal Vrx1 of the first receiving circuit 130 shifts from high to low, the first input signal IN1 which is an input signal to the first transmitting circuit 120 is low, and thus in the first abnormality detection circuit 160, the error signal for the states of the signal Vrx1 and the signal IN1 at falling of the signal Vrx1 is cancelled. It is noted that the error signals at falling of the signal IN1 and rising of the signal Vrx1 are continued, and the first abnormality signal err1 is kept high.

From time t23 to time t30, the operation is the same as that from time t1 to time t8 except for the operation of the first abnormality detection circuit 160.

At time t23, the first input signal IN1 shifts from low to high. In the first abnormality detection circuit 160, when the first input signal IN1 shifts from low to high, the output signal Vrx1 of the first receiving circuit 130 is low, and thus it is determined that there is no abnormality at rising of the signal IN1. However, the error signals at falling of the signal IN1 and rising of the signal Vrx1 are continued, and the first abnormality signal err1 is kept high.

At time t26, when the output signal Vrx1 of the first receiving circuit 130 shifts from low to high, the first input signal IN1 which is an input signal to the first transmitting circuit 120 is high, and thus in the first abnormality detection circuit 160, the error signal for the states of the signal Vrx1 and the signal IN1 at rising of the signal Vrx1 is cancelled. It is noted that the error signal at falling of the signal IN1 is continued, and the first abnormality signal err1 is kept high.

At time t27, when the first input signal IN1 shifts from high to low, the output signal Vrx1 of the first receiving circuit 130 is high, and thus in the first abnormality detection circuit 160, the error signal at falling of the signal IN1 is cancelled. Therefore, in the first abnormality detection circuit 160, all the error signals at riding and falling of each of the first input signal IN1 and the output signal Vrx1 of the first receiving circuit 130 are cancelled, and thus its output (the first abnormality signal err1) is caused to become low.

As described above, the signal transmission circuit 1000 transmits the first input signal IN1 inputted to the first circuit 100, via the insulating transformer 10 (the first coil 110, the second coil 210), and outputs the transmitted signal as the second output signal OUT2 from the second circuit 200. In addition, the signal transmission circuit 1000 delays the received signal Vrx2 (OUT2) in the second circuit 200, transmits the resultant signal to the first circuit 100 via the insulating transformer 10 (the first coil 110, the second coil 210) again, detects abnormality with the first abnormality detection circuit 160, and outputs the first abnormality signal err1.

It is noted that when the control signal of the first direction control section 180 is caused to become low and the control signal of the second direction control section 280 is caused to become high, the second input signal IN2 inputted to the second circuit 200 is transmitted and outputted as the first output signal OUT2 from the first circuit 100, and abnormality detection is performed through self-diagnosis. In this case as well, the first circuit 100 and the second circuit 200 are merely reversed, and the same operation is performed.

In this embodiment, in the signal transmission circuit 1000, the first circuit 100 connected to the first coil 110 and the second circuit 200 connected to the second coil 210 both include the transmitting circuits 120 and 220, the receiving circuits 130 and 230, the switching circuits 140 and 240 which switch between transmission and reception, the switching circuits 150 and 250 which switch between input and output, the abnormality detection circuits 160 and 260, the delay circuits 170 and 270, and the direction control sections 180 and 280. The switching circuits 150 are 250 are controlled by the direction control sections 180 and 280 to switch the signal direction between input and output, and transmission and reception are switched by the switching circuits 140 and 240. In addition, the delay signals VO1 and VO2 which are obtained by delaying the received signal are returned to the transmitting side by the delay circuits 170 and 270, and abnormality detection is performed by the abnormality detection circuits 160 and 260, thereby performing self-diagnosis.

Thus, it is possible to achieve signal transmission and self-diagnosis for both directions by using the common insulating transformer 10, and it is possible to provide a low-cost signal transmission circuit which has a self-diagnosis function with a simple circuit configuration having a decreased circuit area and a decreased mounting area.

The switching circuits 140 and 240 are controlled in accordance with the signals A and B inputted to the transmitting circuits 120 and 220, respectively, and during a period when the one switching circuit 140 (240) selects the transmitting circuit 120 (220), the other switching circuit 240 (140) selects the receiving circuit 230 (130). Thus, transmission and reception via the insulating transformer 10 are enabled, and transmission and reception of a signal to be transmitted and transmission and reception of a delay signal for self-diagnosis can occupy the insulating transformer 10 in different periods, respectively. Thus, it is possible to achieve signal transmission and self-diagnosis with high reliability by using the common insulating transformer 10.

The switching circuits 150 and 250 switch the signal of signal transmission and the delay signal to the input signals A and B to the transmitting circuits 120 and 220, whereby it is possible to achieve signal transmission and self-diagnosis with high reliability for both directions by using the common insulating transformer 10.

The direction control sections 180 and 280 are provided to control the switching circuits 150 and 250 and to operate the abnormality detection circuits 160 and 260, and thus it is possible to control signal transmission involving self-diagnosis with high reliability.

Since the power conversion device includes such a signal transmission circuit, it is possible to promote size reduction and cost reduction of the power conversion device which has high reliability in signal transmission of the control signal and has improved controllability.

Embodiment 2

Next, a signal transmission circuit according to Embodiment 2 of the present invention will be described based on the drawings.

Figure 13:
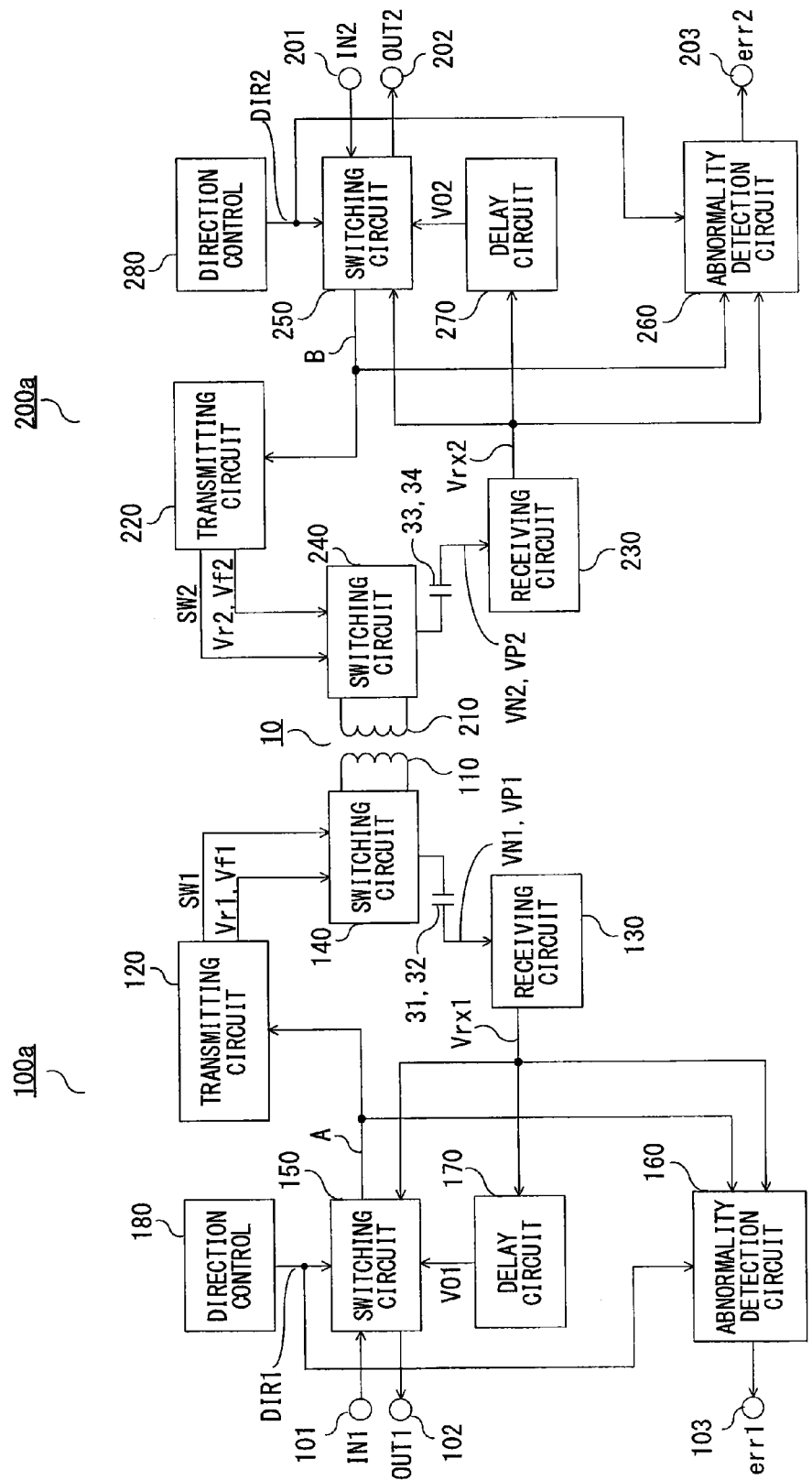
FIG. 13 is a block diagram showing a schematic configuration of a signal transmission circuit according to Embodiment 2 of the present invention.

FIG. 13 is a block diagram showing a schematic configuration of a signal transmission circuit 2000 according to Embodiment 2 of the present invention. In Embodiment 2, capacitors 31 to 34 having a predetermined capacity are provided at the input sides of the first and second receiving circuits 130 and 230 in the signal transmission circuit 1000 shown in Embodiment 1 described above.

As shown in FIG. 13, the signal transmission circuit 2000 includes: an insulating transformer 10 including a first coil 110 and a second coil 210; a first circuit 100a connected to the first coil 110; and a second circuit 200a connected to the second coil 210, and performs bidirectional signal transmission with abnormality detection by self-diagnosis.

Figure 14:
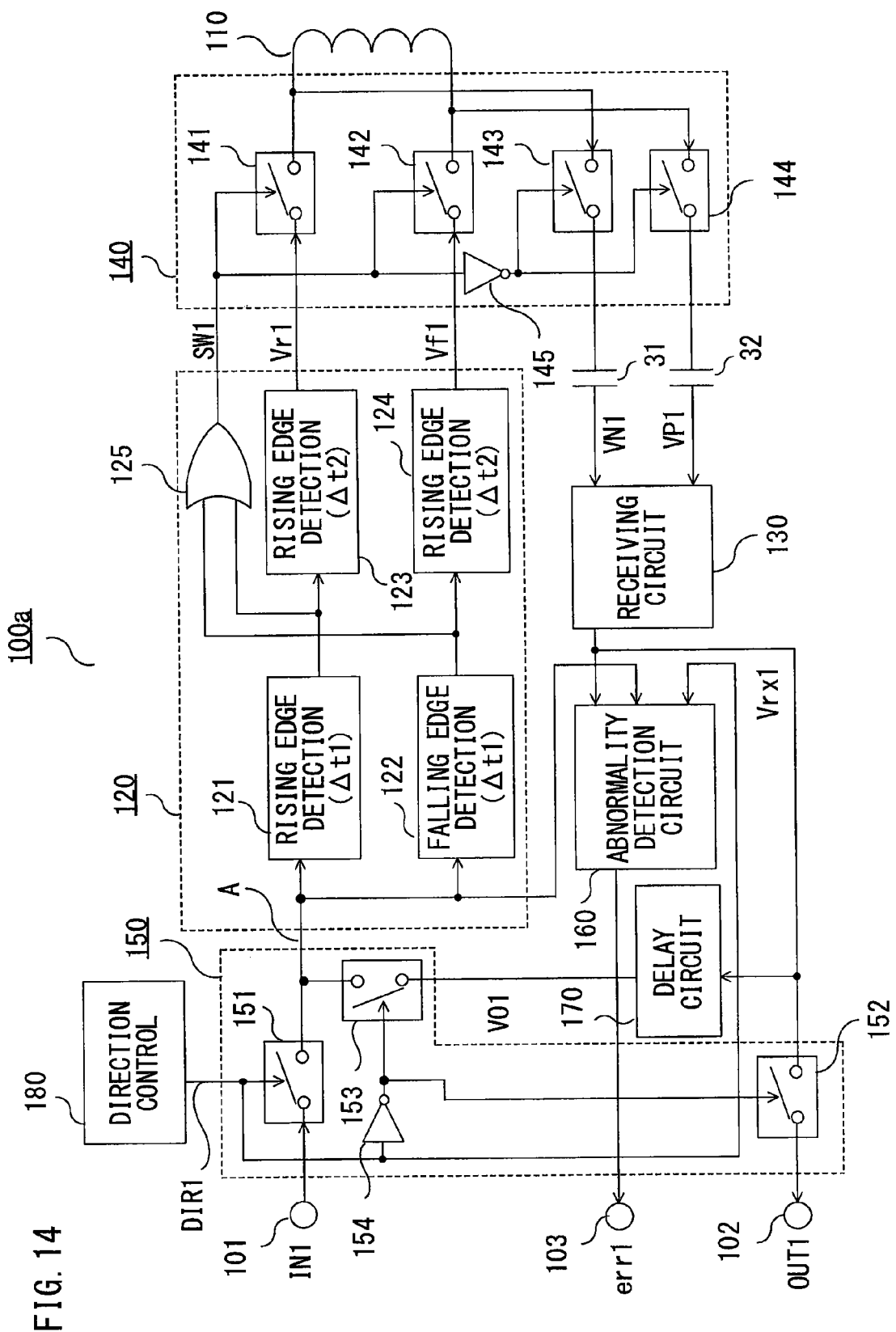
FIG. 14 is a diagram showing the configuration of a first circuit of the signal transmission circuit according to Embodiment 2 of the present invention.
Figure 15:
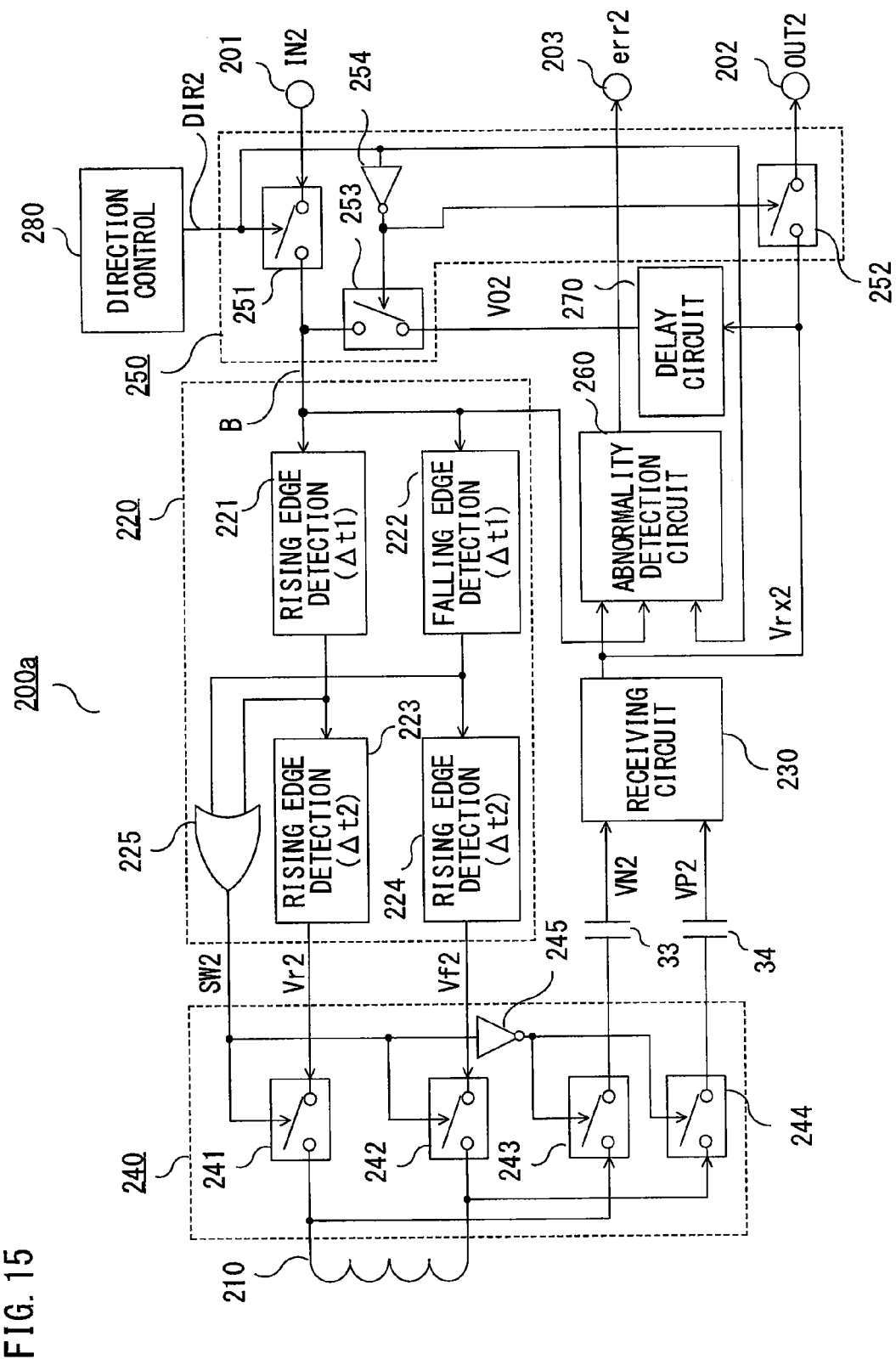
FIG. 15 is a diagram showing the configuration of a second circuit of the signal transmission circuit according to Embodiment 2 of the present invention.

FIG. 14 shows the circuit configuration of the first circuit 100a, and FIG. 15 shows the circuit configuration of the second circuit 200a. In the first circuit 100a, the capacitors 31 and 32 are connected between the first receiving circuit 130 and the two switches 143 and 144 within the first switching circuit 140, respectively. In the second circuit 200a, the capacitors 33 and 34 are connected between the second receiving circuit 230 and the two switches 243 and 244 within the second switching circuit 240, respectively. The other configuration is the same as in Embodiment 1 described above.

Figure 16:
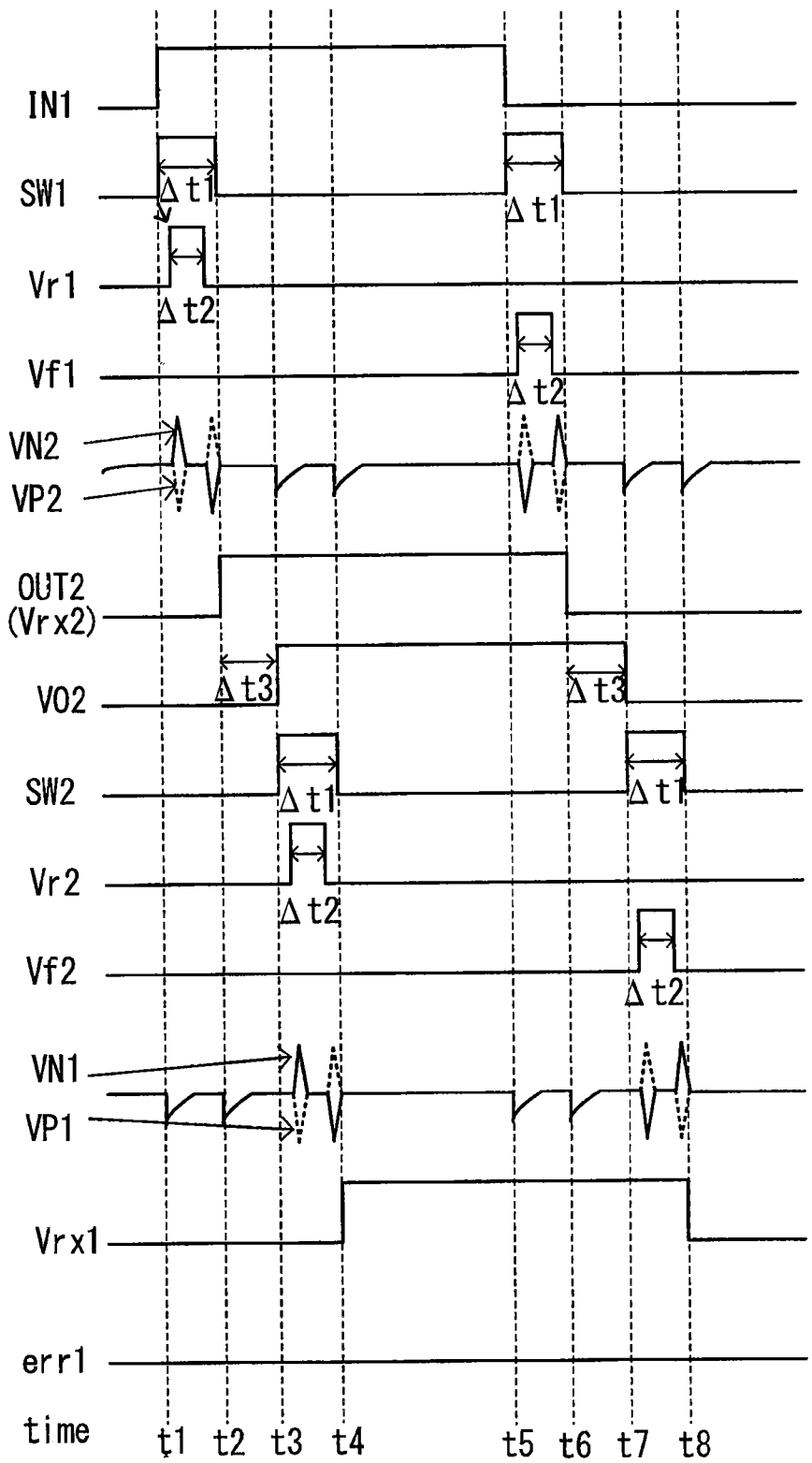
FIG. 16 is a diagram showing an operation waveform of the signal transmission circuit according to Embodiment 2 of the present invention.

FIG. 16 is a diagram showing an operation waveform of the signal transmission circuit 2000, the control signal of the first direction control section 180 is high, the control signal of the second direction control section 280 is low, and a first input signal IN1 inputted to the first circuit 100a is transmitted and outputted as a second output signal OUT2 from the second circuit 200a. In this case, the shapes of the waveforms other than the shapes of the waveforms of signals VN1 and VP1 and signals VN2 and VP2 which occur at the first ends and the second ends of the respective first coil 110 and second coil 210 are the same as shown in FIG. 5 for Embodiment 1 described above. Hereinafter, the difference from Embodiment 1 described above will be mainly described.

At time t1, the first input signal IN1 shifts from low to high. The first input signal IN1 is inputted to the first transmitting circuit 120 and the first abnormality detection circuit 160, and in the first transmitting circuit 120, when the first input signal IN1 shifts from low to high, a signal SW1 which is at a high level over a period Δt1 is generated by using the rising edge detection section 121 and the OR circuit 125. The high signal SW1 having a period Δt1 turns ON the two switches 141 and 142 which connect the transmitting path within the first switching circuit 140, and turns OFF the two switches 143 and 144 which connect the receiving path within the first switching circuit 140.

When ON and OFF of these switches 141 to 144 are switched, depending on the timings of ON and OFF, there is a concern that the output side of the first transmitting circuit 120 and the input side of the first receiving circuit 130 instantaneously become electrically connected to each other. In such a case, by the capacitors 31 and 32 inserted into the receiving path, instantaneous electrical connection between the output of the first transmitting circuit 120 and the input of the first receiving circuit 130 is suppressed.

Also at times t2, t5, and t6, similarly, by the capacitors 31 and 32 inserted into the receiving path, instantaneous electrical connection between the output of the first transmitting circuit 120 and the input of the first receiving circuit 130 is suppressed. Thus, it is possible to suppress distortion of the signals VN1 and VP1 inputted to the first receiving circuit 130 which is caused when the signal SW1 changes.

In addition, also at times t3, t4, t7, and t8, similarly, by the capacitors 33 and 34 inserted into the receiving path of the second receiving circuit 230, instantaneous electrical connection between the output of the second transmitting circuit 220 and the input of the second receiving circuit 230 is suppressed. Thus, it is possible to suppress distortion of the signals VN2 and VP2 inputted to the second receiving circuit 230 which is caused when the signal SW2 changes.

As described above, in this embodiment, since the capacitors 31 to 34 are provided at the input sides of the receiving circuits 130 and 230, it is possible to suppress distortion of the received signals of the receiving circuits 130 and 230 which is caused when the signals SW1 and SW2 change. Thus, the reliability of the received signals of the receiving circuits 130 and 230 improves, and the reliability of both signal transmission and self-diagnosis improves.

Embodiment 3

Next, a signal transmission circuit according to Embodiment 3 of the present invention will be described based on the drawings.

Figure 17:
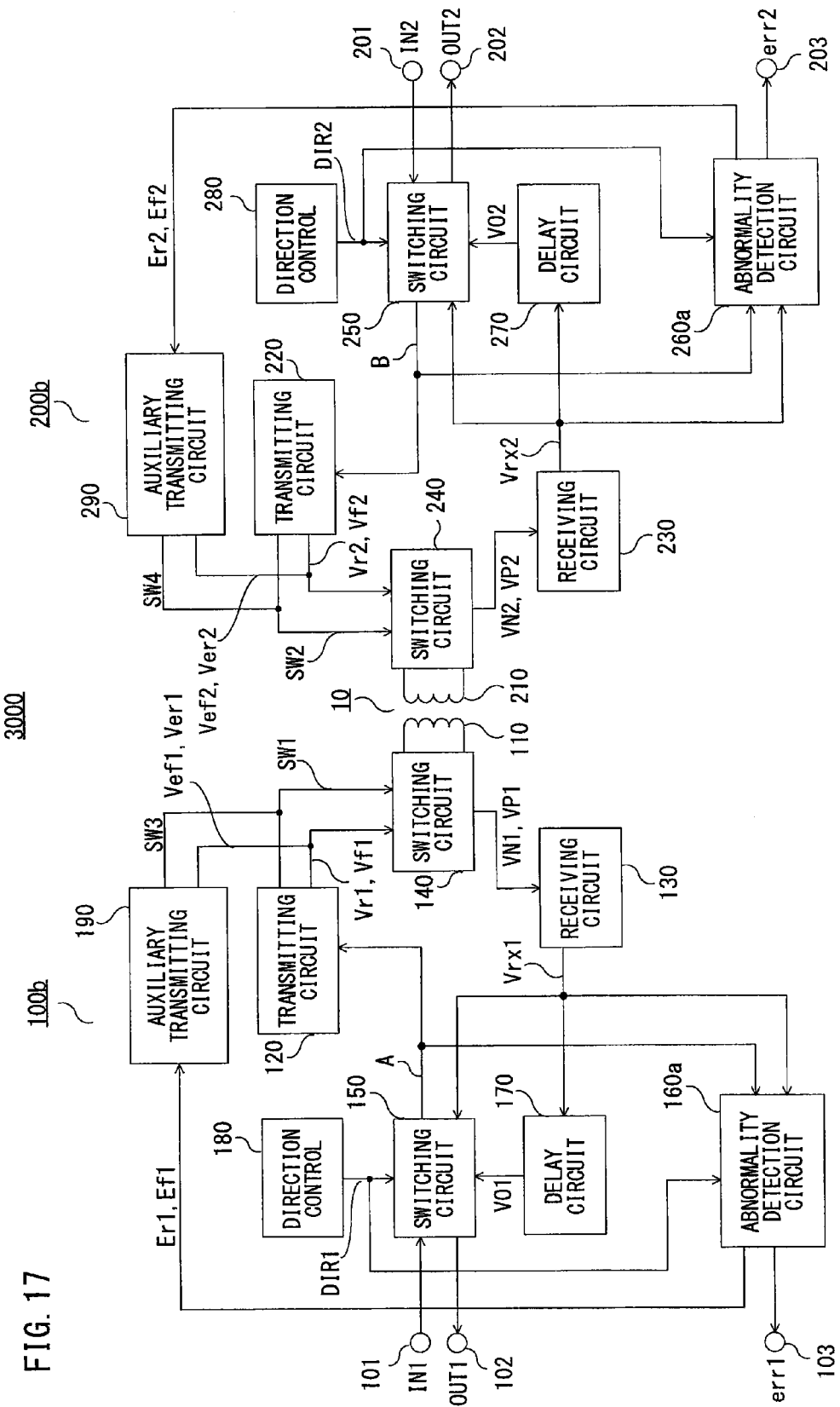
FIG. 17 is a block diagram showing a schematic configuration of a signal transmission circuit according to Embodiment 3 of the present invention.

FIG. 17 is a block diagram showing a schematic configuration of a signal transmission circuit 3000 according to Embodiment 3 of the present invention.

Figure 18:
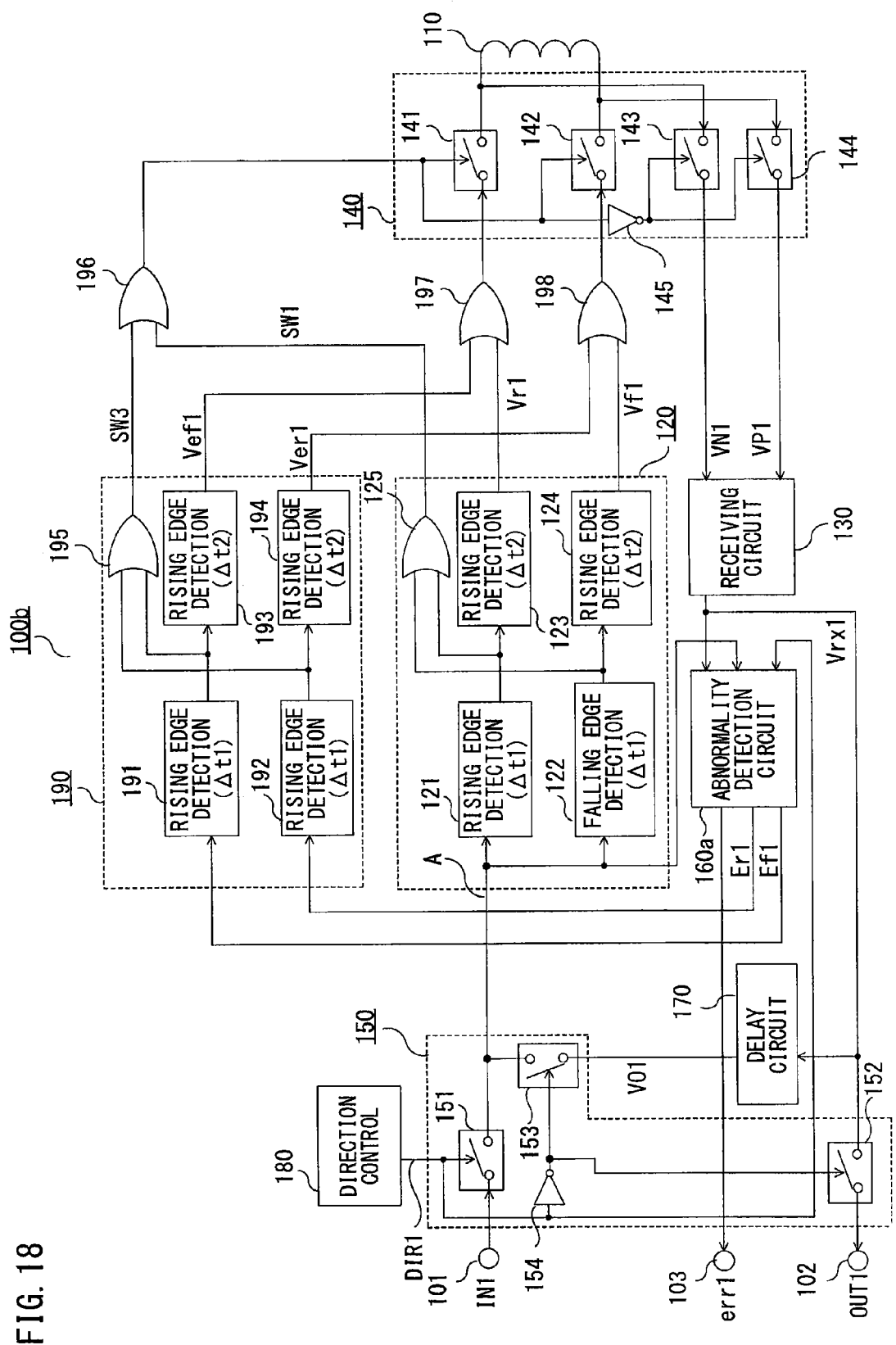
FIG. 18 is a diagram showing the configuration of a first circuit of the signal transmission circuit according to Embodiment 3 of the present invention.
Figure 19:
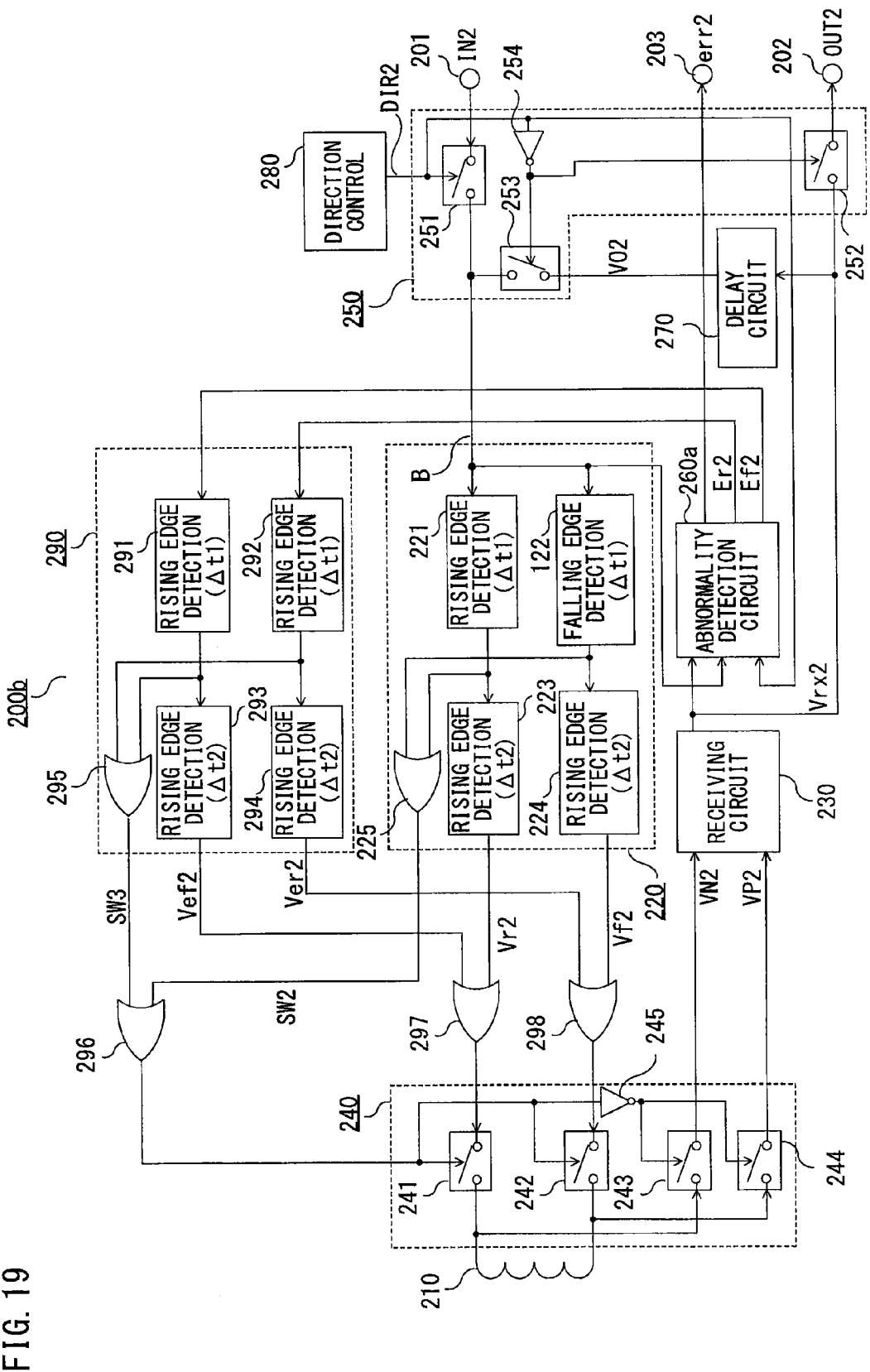
FIG. 19 is a diagram showing the configuration of a second circuit of the signal transmission circuit according to Embodiment 3 of the present invention.

As shown in FIG. 17, the signal transmission circuit 3000 includes: an insulating transformer 10 including a first coil 110 and a second coil 210; a first circuit 100b connected to the first coil 110; and a second circuit 200b connected to the second coil 210, and performs bidirectional signal transmission with abnormality detection by self-diagnosis. FIG. 18 shows the circuit configuration of the first circuit 100b, and FIG. 19 shows the circuit configuration of the second circuit 200b. Hereinafter, the difference from Embodiment 1 described above will be mainly described.

The first circuit 100b includes a first transmitting circuit 120, a first receiving circuit 130, a first switching circuit 140, a third switching circuit 150, a first abnormality detection circuit 160a, a first delay circuit 170, a first direction control section 180, a first auxiliary transmitting circuit 190, and OR circuits 196 to 198.

The first transmitting circuit 120, the first receiving circuit 130, the first switching circuit 140, the third switching circuit 150, the first delay circuit 170, and the first direction control section 180 have the same configuration as in Embodiment 1 described above.

The first abnormality detection circuit 160a compares the output signal Vrx1 from the first receiving circuit 130 with the signal A inputted to the first transmitting circuit 120, to detect abnormality, and outputs the first abnormality signal err1. In addition, the first abnormality detection circuit 160a detects abnormality through comparison with the signal A at the timings of rising and falling of the signal Vrx1, and outputs the first abnormality detection signals Er1 and Ef1, respectively. The first auxiliary transmitting circuit 190 generates first abnormality correction signals Ver1 and Vef1 to be transmitted to the first coil 110, on the basis of the first abnormality detection signals Er1 and Ef1.

Similarly to the first circuit 100b, the second circuit 200b includes a second transmitting circuit 220, a second receiving circuit 230, a second switching circuit 240, a fourth switching circuit 250, a second abnormality detection circuit 260a, a second delay circuit 270, a second direction control section 280, a second auxiliary transmitting circuit 290, and OR circuits 296 to 298. The second transmitting circuit 220, the second receiving circuit 230, the second switching circuit 240, the fourth switching circuit 250, the second delay circuit 270, and the second direction control section 280 have the same configuration as in Embodiment 1 described above.

The second abnormality detection circuit 260a compares the output signal Vrx2 from the second receiving circuit 230 with the signal B inputted to the second transmitting circuit 220, to detect abnormality, and outputs the second abnormality signal err2. In addition, the second abnormality detection circuit 260a detects abnormality through comparison with the signal B at the timings of rising and falling of the signal Vrx2, and outputs the second abnormality detection signals Er2 and Ef2, respectively. The second auxiliary transmitting circuit 290 generates second abnormality correction signals Ver1 and Vef2 to be transmitted to the second coil 210, on the basis of the second abnormality detection signals Er2 and Ef2.

The first auxiliary transmitting circuit 190 includes rising edge detection sections 191 to 194 and an OR circuit 195. The rising edge detection section 191 detects a rising edge of the first abnormality detection signal Ef1 which is an error signal at falling of the signal Vrx1, and generates a pulse signal having a pulse width Δt1. The rising edge detection section 192 detects a rising edge of the first abnormality detection signal Er1 which is an error signal at rising of the signal Vrx1, and generates a pulse signal having the pulse width Δt1. On the basis of a pulse signal which is generated by using the OR circuit 196 from: a control signal SW1 generated in the first transmitting circuit 120; and a pulse signal (control signal SW3) generated through the OR circuit 195 from the pulse signals from the rising edge detection sections 191 and 192, the first switching circuit 140 is controlled.

The rising edge detection sections 193 and 194 detect rising edges of the pulse signals having the pulse width Δt1 detected with the rising edge detection sections 191 and 192, respectively, and generate and output pulse signals having a pulse width Δt2 which are the first abnormality correction signals Ver1 and Vef1 to be transmitted to the first coil 110.

It is noted that the rising edge detection sections 191 and 192 have the same configuration as that of the rising edge detection section 121 of the first transmitting circuit 120, and the rising edge detection sections 193 and 194 have the same configuration as those of the rising edge detection sections 123 and 124 of the first transmitting circuit 120.

The first abnormality correction signal Vef1 and the transmission signal Vr1 from the first transmitting circuit 120 are passed through the OR circuit 197, and further transmitted via the first switching circuit 140 to the first end of the first coil 110. In addition, the first abnormality correction signal Ver1 and the transmission signal Vf1 from the first transmitting circuit 120 are passed through the OR circuit 198, and further transmitted via the first switching circuit 140 to the second end of the first coil 110.

Similarly to the first auxiliary transmitting circuit 190, the second auxiliary transmitting circuit 290 includes rising edge detection sections 291 to 294 and an OR circuit 295, and generates a control signal SW4 and generates second abnormality correction signals Ver2 and Vef2. On the basis of a pulse signal generated by using the OR circuit 296 from the control signal SW4 and a control signal SW2 generated in the second transmitting circuit 220, the second switching circuit 240 is controlled. In addition, the second abnormality correction signals Vef2 and Ver2 and the transmission signals Vr1 and Vf1 from the second transmitting circuit 120 are passed through the respective OR circuits 297 and 298, and further transmitted via the second switching circuit 240 to the first end and the second end of the second coil 110.

Next, the first abnormality detection circuit 160a will be described in detail. It is noted that the second abnormality detection circuit 260a is the same as the first abnormality detection circuit 160a and thus the description thereof is omitted.

Figure 20:
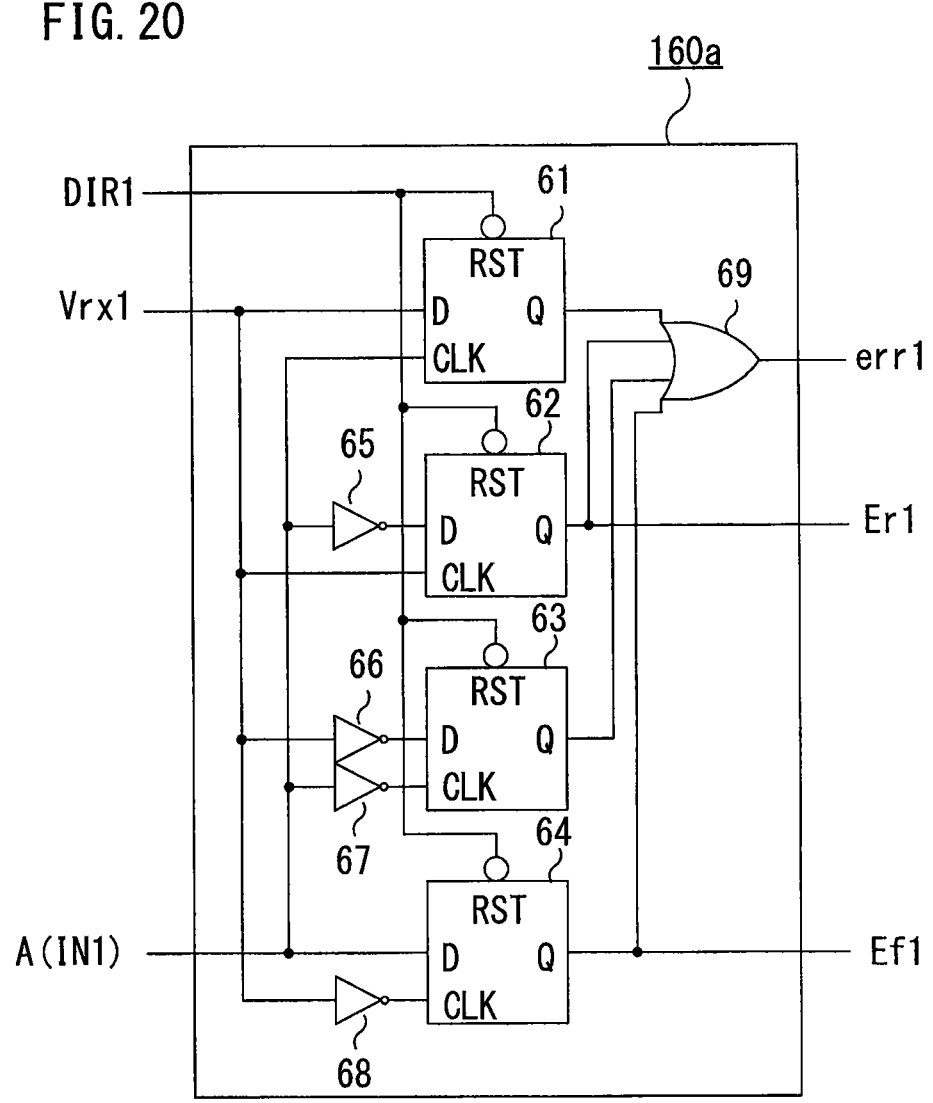
FIG. 20 is a diagram showing the circuit configuration of an abnormality detection circuit according to Embodiment 3 of the present invention.

FIG. 20 is a circuit diagram showing the configuration of the first abnormality detection circuit 160a. As shown in FIG. 20, the first abnormality detection circuit 160a outputs, as the first abnormality detection signals Er1 and Ef1, the respective error signals from the two DFF circuits 62 and 64 among the four data flip-flop circuits (DFF circuits) 61 to 64 in the first abnormality detection circuit 160 (see FIG. 10) used in Embodiment 1 described above, and also outputs the same first abnormality signal err1 as in Embodiment 1 described above. An operation waveform of the first abnormality detection circuit 160a is also the same as that shown in FIG. 11.

The input of the first transmitting circuit 120 (the signal A) is connected via the inverter 65 to the data terminal D of the DFF circuit 62, the output of the first receiving circuit 130 (the signal Vrx1) is connected to the clock terminal CLK of the DFF circuit 62, and the DFF circuit 62 outputs an error signal (first abnormality detection signal Er1) through comparison with the signal A at the timing of rising of the signal Vrx1. In addition, the input of the first transmitting circuit 120 (the signal A) is connected to the data terminal D of the DFF circuit 64, the output of the first receiving circuit 130 (the signal Vrx1) is connected via the inverter 68 to the clock terminal CLK of the DFF circuit 64, and the DFF circuit 64 outputs an error signal (first abnormality detection signal Ef1) through comparison with the signal A at the timing of falling of the signal Vrx1.

Next, an operation of the entire signal transmission circuit 3000 will be described with reference to FIGS. 21 and 22. In this case, the control signal of the first direction control section 180 is high, the control signal of the second direction control section 280 is low, and a first input signal IN1 inputted to the first circuit 100b is transmitted and outputted as a second output signal OUT2 from the second circuit 200b, but the same applies to the case of the opposite direction. FIG. 22 is an enlarged diagram of a part of FIG. 21 for clarification.

Figure 21:
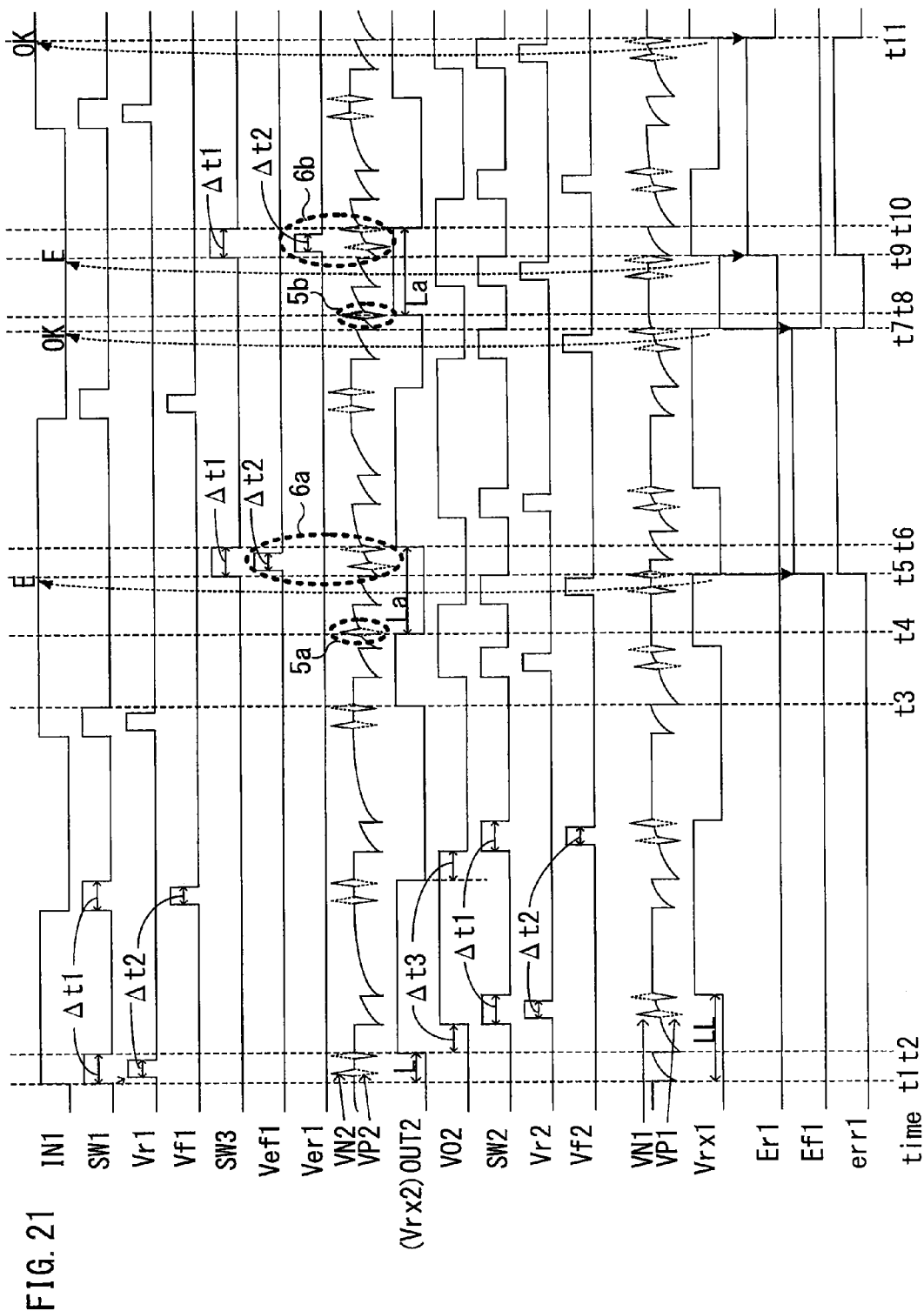
FIG. 21 is a diagram showing an operation waveform of the signal transmission circuit according to Embodiment 3 of the present invention.
Figure 22:
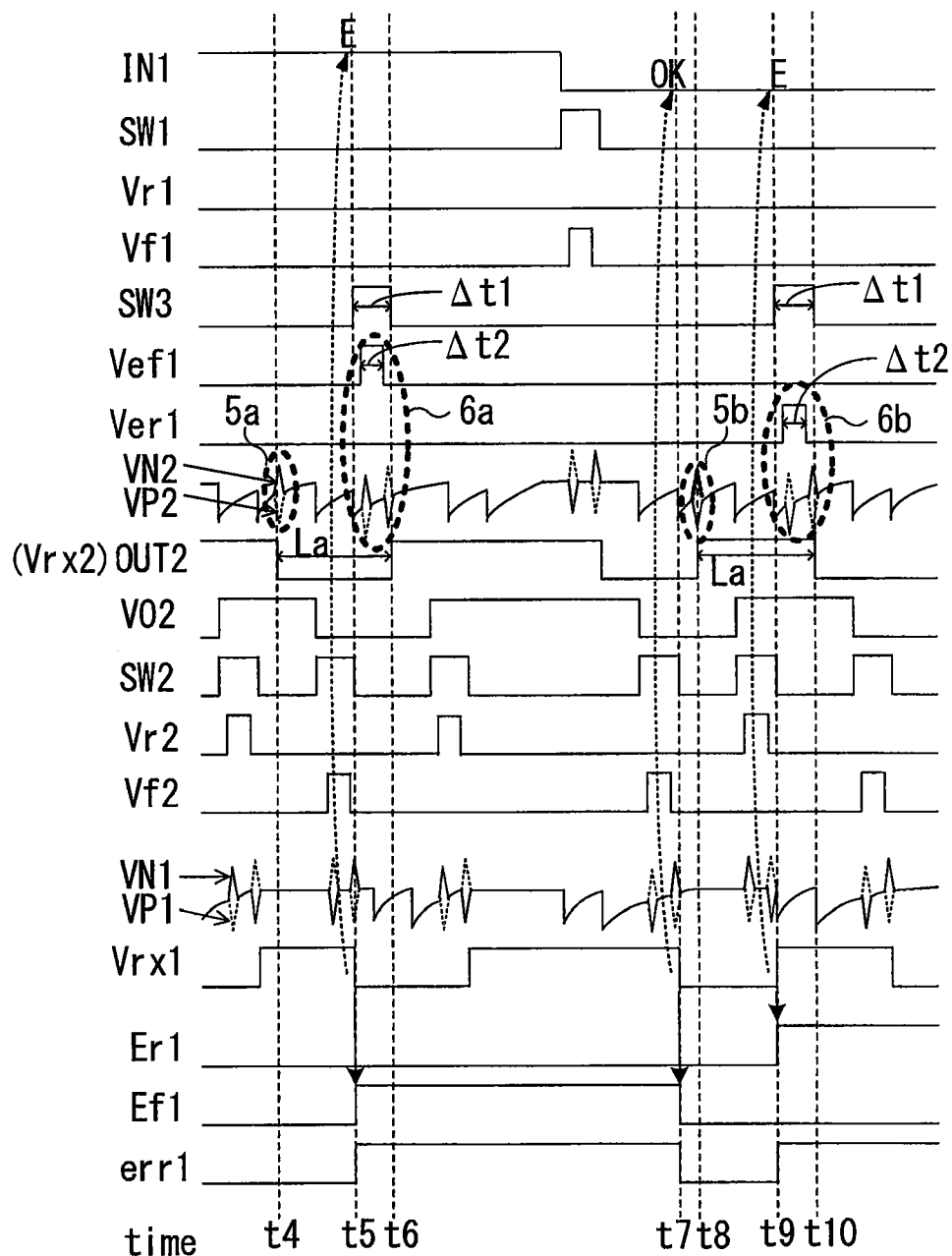
FIG. 22 is a partially enlarged view showing a part of the operation waveform of the signal transmission circuit according to Embodiment 3 of the present invention.

FIGS. 21 and 22 show operation waveforms of: the first input signal IN1 (the input signal A of the first transmitting circuit 120); the control signal SW1 outputted from the first transmitting circuit 120 to the first switching circuit 140; the transmission signals Vr1 and Vf1 transmitted from the first transmitting circuit 120 to the first end and the second end of the first coil 110, respectively; the control signal SW3 outputted from the first auxiliary transmitting circuit 190 to the first switching circuit 140; the first abnormality correction signals Vef1 and Ver1 transmitted from the first auxiliary transmitting circuit 190 to the first end and the second end of the first coil 110, respectively; the signals VN2 and VP2 generated at the first end and the second end of the second coil 210 and received by the second receiving circuit 230; the second output signal OUT2 (the output signal Vrx2 of the second receiving circuit 230); the delay signal VO2 from the second delay circuit 270; the control signal SW2 outputted from the second transmitting circuit 220 to the second switching circuit 240; the transmission signals Vr2 and Vf2 transmitted from the second transmitting circuit 220 to the first end and the second end of the second coil 210, respectively; the signals VN1 and VP1 generated at the first end and the second end of the first coil 110 and received by the first receiving circuit 130; the output signal Vrx1 of the first receiving circuit 130; the first abnormality detection signals Er1 and Ef1 outputted from the first abnormality detection circuit 160; and the first abnormality signal err1.

It is noted that when the control signal of the second direction control section 280 is low, the second abnormality detection circuit 260*a* does not operate, and all the outputs SW4, Vef2, and Ver1 of the second auxiliary transmitting circuit 290 which operates on the basis of the output of the second abnormality detection circuit 260*a* are low. Thus, the second switching circuit 240 is controlled on the basis of only the signal SW2, and the transmission signals to the second coil 210 are also only the signals Vr2 and Vf2.

In a normal state, the same operation as in Embodiment 1 described above is performed, and the second output signal OUT2 which is generated by delaying the inputted first input signal IN1 by a predetermined period L (≤Δt1) with the same waveform is outputted. Then, the signal Vrx1 is generated by delaying the delay signal VO2, which is obtained by delaying the second output signal OUT2 by a period Δt3, further by a predetermined period L (≤Δt1) with the same waveform, and the signal Vrx1 and the first input signal IN1 are compared with each other to detect abnormality. In a normal state, the signal Vrx1 is a signal obtained by delaying the first input signal IN1 by a period LL (≤2(Δt1)+Δt3) with the same waveform.

As shown in FIGS. 21 and 22, the second output signal OUT2 becomes abnormal (low) at time t4 due to occurrence of noise 5*a* in the signals VN2 and VP2 from the second coil 210 to the second receiving circuit 230, and the first abnormality detection signal Ef1 and the first abnormality signal err1 are high at and after time t5. Thus, a first abnormality correction signal Vef1 which is a high signal having a period Δt2 is generated, the second output signal OUT2 returns at time t6, and the first abnormality detection signal Ef1 and the first abnormality signal err1 become low at time t7. In addition, the second output signal OUT2 becomes abnormal (high) at time t8 due to occurrence of noise 5*b* in the signals VN2 and VP2 from the second coil 210 to the second receiving circuit 230, and the first abnormality detection signal Er1 and the first abnormality signal err1 are high at and after time t9. Thus, a first abnormality correction signal Ver1 which is a high signal having a period Δt2 is generated, the second output signal OUT2 returns at time t10, and the first abnormality detection signal Er1 and the first abnormality signal err1 become low at time t11.

It is noted that an operation from time t1 to time t3 in a normal state is the same as the operation (corresponding to times t1 to t10 in FIG. 5) shown in FIG. 5 for Embodiment 1 described above.

At time t4, when the output signal Vrx2 of the second receiving circuit 230 is high and the signal SW2 for controlling the second switching circuit 240 within the second circuit 200*b* is low, noise 5*a* occurs in the signals VN2 and VP2 from the second coil 210 and is inputted to the second receiving circuit 230. In this case, the noise 5*a* occurs with a relationship of VN2>VP2, the difference between the signals VN2 and VP2 becomes greater than the threshold of the second receiving circuit 230, and the output signal Vrx2 of the second receiving circuit 230 is inverted to be low, and is outputted as the second output signal OUT2.

Then, the signal VO2 which is obtained by delaying the output signal Vrx2 of the second receiving circuit 230 by the period Δt3 using the second delay circuit 270 shifts from high to low, and the second transmitting circuit 220 generates a signal SW2 which is at a high level over a period Δt1, by using the falling edge detection section 222 and the OR circuit 225, to connect the transmitting path within the second switching circuit 240 and disconnect the receiving path within the second switching circuit 240. In addition, the second transmitting circuit 220 generates a signal Vf2 which is at a high level over a period Δt2, and inputs the signal Vf2 to the second end of the second coil 210, causing current change in the second coil 210. In the first coil 110, induced voltage signals VN1 and VP1 of bipolar double pulses are induced by the current change of the second coil 210 and outputted.

During the high signal SW2 having a period Δt1, the signals SW1 and SW3 for controlling the first switching circuit 140 are low, the transmitting path within the first switching circuit 140 is disconnected, the receiving path within the first switching circuit 140 is connected, and the induced voltage signals VN1 and VP1 outputted from the first coil 110 are inputted to the respective input terminals of the first receiving circuit 130.

At time t5, when the difference between the second pulses of the induced voltage signals VN1 and VP1 of the bipolar double pulses which are received by the first receiving circuit 130 becomes greater than the threshold of the first receiving circuit 130, the output signal Vrx1 of the first receiving circuit 130 is inverted to be low, and is inputted to the first abnormality detection circuit 160*a*. In addition, when the output signal Vrx1 of the first receiving circuit 130 shifts from high to low, the first input signal IN1 which is an input signal to the first transmitting circuit 120 is high, and thus the first abnormality detection circuit 160*a* causes the first abnormality signal err1 and the first abnormality detection signal Ef1, which is an error signal at the timing of falling of the signal Vrx1, to shift from low to high.

The first abnormality detection signal Ef1 is inputted to the first auxiliary transmitting circuit 190, and in the first auxiliary transmitting circuit 190, when the first abnormality detection signal Ef1 shifts from low to high, a signal SW3 which is at a high level over a period Δt1 is generated by using the rising edge detection section 191 and the OR circuit 195. The high signal SW3 having a period Δt1 is inputted via the OR circuit 196 to the first switching circuit 140, turns ON the two switches 141 and 142 which connect the transmitting path, and turns OFF the two switches 143 and 144 which connect the receiving path. In addition, a high signal having a period Δt1 which is an output of the rising edge detection section 191 is inputted to the rising edge detection section 193, and a first abnormality correction signal Vef1 which is at a high level over a period Δt2 is generated. The first abnormality correction signal Vef1 is inputted to the first end of the first coil 110, causing current change in the first coil 110 in accordance with change in the logical value of the first abnormality correction signal Vef1. In the second coil 210, induced voltage signals VN2 and VP2 of bipolar double pulses are induced by the current change of the first coil 110 and outputted. This first abnormality correction signal Vef1 and these induced voltage signals VN2 and VP2 of the double pulses are shown in an abnormality correction portion 6a in the drawings.

During the high signal SW3 having a period $\Delta t1$, the signal SW2 for controlling the second switching circuit 240 is low, the transmitting path within the second switching circuit 240 is disconnected, and the receiving path within the second switching circuit 240 is connected. The induced voltage signals VN2 and VP2 outputted from the second coil 210 are inputted to the respective input terminals of the second receiving circuit 230.

At time t6, when the difference between the second pulses of the induced voltage signals VN2 and VP2 of the bipolar double pulses which are received by the second receiving circuit 230 becomes greater than the threshold of the second receiving circuit 230, the output signal Vrx2 of the second receiving circuit 230 is inverted to be high, and is outputted as the second output signal OUT2. Thus, the second output signal OUT2 which has shifted from high to low at time t4 due to abnormality returns to high.

When the second output signal OUT2 becomes low at time t4, the signal Vrx1 is delayed further by a predetermined period L ($\leq \Delta t1$) to become low due to the signal SW2 having a high level on the basis of the delay signal VO2 which is delayed by a period $\Delta t3$ to become low. Then, due to the signal SW3 having a high level, the second output signal OUT2 is delayed further by a predetermined period L ($\leq \Delta t1$) to become high. Thus, a period from the time when abnormality occurs in the second output signal OUT2 to the time when the second output signal OUT2 returns is La ($\leq 2(\Delta t1)+\Delta t3$). It is noted that the period La is a period which is substantially equal to or slightly shorter than ($2(\Delta t1)+\Delta t3$).

At time t7, the output signal Vrx1 of the first receiving circuit 130 is delayed by a period LL to become low on the basis of change of the first input signal IN1 from high to low. When the signal Vrx1 shifts from high to low, the first input signal IN1 is low, and thus in the first abnormality detection circuit 160a, the first abnormality detection signal Ef1 which is an error signal at the timing of falling of the signal Vrx1 is cancelled to be low, and the first abnormality signal err1 is caused to become low at the same time.

At time t8, when the output signal Vrx2 of the second receiving circuit 230 is low and the signal SW2 for controlling the second switching circuit 240 within the second circuit 200b is low, noise 5b occurs in the signals VN2 and VP2 from the second coil 210 and is inputted to the second receiving circuit 230. In this case, the noise 5b occurs with a relationship of VN2<VP2, the difference between the signals VN2 and VP2 becomes greater than the threshold of the second receiving circuit 230, and the output signal Vrx2 of the second receiving circuit 230 is inverted to be high, and is outputted as the second output signal OUT2.

Then, the signal VO2 which is obtained by delaying the output signal Vrx2 of the second receiving circuit 230 by a period $\Delta t3$ using the second delay circuit 270 shifts from low to high, and the second transmitting circuit 220 generates a signal SW2 which is at a high level over a period $\Delta t1$, by using the rising edge detection section 221 and the OR circuit 225, to connect the transmitting path within the second switching circuit 240 and disconnect the receiving path within the second switching circuit 240. In addition, the second transmitting circuit 220 generates a signal Vr2 which is at a high level over a period $\Delta t2$, and inputs the signal Vr2 to the first end of the second coil 210, causing current change in the second coil 210. In the first coil 110, induced voltage signals VN1 and VP1 of bipolar double pulses are induced by the current change of the second coil 210 and outputted.

During the high signal SW2 having a period $\Delta t1$, the signals SW1 and SW3 for controlling the first switching circuit 140 are low, the transmitting path within the first switching circuit 140 is disconnected, the receiving path within the first switching circuit 140 is connected, and the induced voltage signals VN1 and VP1 outputted from the first coil 110 are inputted to the respective input terminals of the first receiving circuit 130.

At time t9, when the difference between the second pulses of the induced voltage signals VN1 and VP1 of the bipolar double pulses which are received by the first receiving circuit 130 becomes greater than the threshold of the first receiving circuit 130, the output signal Vrx1 of the first receiving circuit 130 is inverted to be high, and is inputted to the first abnormality detection circuit 160a. In addition, when the output signal Vrx1 of the first receiving circuit 130 shifts from low to high, the first input signal IN1 which is an input signal to the first transmitting circuit 120 is low, and thus the first abnormality detection circuit 160a causes the first abnormality signal err1 and the first abnormality detection signal Er1, which is an error signal at the timing of rising of the signal Vrx1, to shift from low to high.

The first abnormality detection signal Er1 is inputted to the first auxiliary transmitting circuit 190, and in the first auxiliary transmitting circuit 190, when the first abnormality detection signal Er1 shifts from low to high, a signal SW3 which is at a high level over a period $\Delta t1$ is generated by using the rising edge detection section 192 and the OR circuit 195. The high signal SW3 having a period $\Delta t1$ is inputted via the OR circuit 196 to the first switching circuit 140, turns ON the two switches 141 and 142 which connect the transmitting path, and turns OFF the two switches 143 and 144 which connect the receiving path. In addition, a high signal having a period $\Delta t1$ which is an output of the rising edge detection section 192 is inputted to the rising edge detection section 194, and a first abnormality correction signal Ver1 which is at a high level over a period $\Delta t2$ is generated. The first abnormality correction signal Ver1 is inputted to the second end of the first coil 110, causing current change in the first coil 110 in accordance with the logical value of the first abnormality correction signal Ver1. In the second coil 210, induced voltage signals VN2 and VP2 of bipolar double pulses are induced by the current change of the first coil 110 and outputted. This first abnormality correction signal Ver1 and these induced voltage signals VN2 and VP2 of the double pulses are shown in an abnormality correction portion 6b in the drawings.

During the high signal SW3 having a period $\Delta t1$, the signal SW2 for controlling the second switching circuit 240 is low, the transmitting path within the second switching circuit 240 is disconnected, and the receiving path within the second switching circuit 240 is connected. The induced voltage signals VN2 and VP2 outputted from the second coil 210 are inputted to the respective input terminals of the second receiving circuit 230.

At time t10, when the difference between the second pulses of the induced voltage signals VN2 and VP2 of the bipolar double pulses which are received by the second receiving circuit 230 becomes greater than the threshold of the second receiving circuit 230, the output signal Vrx2 of the second receiving circuit 230 is inverted to be high, and is outputted as the second output signal OUT2. Thus, the second output signal OUT2 which has shifted from low to high at time t8 due to abnormality returns to low after the period La ($\leq 2(\Delta t1)+\Delta t3$).

At time t11, the output signal Vrx1 of the first receiving circuit 130 is delayed by a period LL to become high on the basis of change of the first input signal IN1 from low to high. When the signal Vrx1 shifts from low to high, the first input signal IN1 is high, and thus in the first abnormality detection circuit 160a, the first abnormality detection signal Er1 which is an error signal at the timing of rising of the signal Vrx1 is cancelled to be low, and the first abnormality signal err1 is caused to become low at the same time.

In this embodiment, the first abnormality detection circuit 160a detects abnormality through comparison with the first input signal IN1 (signal A) at the respective timings of rising and falling of the output signal Vrx1 of the first receiving circuit 130, and outputs the first abnormality detection signals Er1 and Ef1 together with the first abnormality signal err1. The first auxiliary transmitting circuit 190 is provided which generates the first abnormality correction signals Ver1 and Vef1 on the basis of the first abnormality detection signals Er1 and Ef1, respectively, and transmits the first abnormality correction signals Ver1 and Vef1 to the second end and the first end of the first coil.

Thus, the same effects as those in Embodiment 1 described above are obtained. In addition, the second output signal OUT2 whose logical value has changed due to abnormality is forcedly and immediately returned, the first abnormality detection signals Er1 and Ef1 are cancelled, and the first abnormality signal err1 is also immediately cancelled.

This case has been described only for one direction, but the same applies to the case of the opposite direction, and it is possible to immediately perform abnormality elimination in bidirectional signal transmission.

Embodiment 4

Next, a signal transmission circuit according to Embodiment 4 of the present invention will be described based on the drawings.

Figure 23:
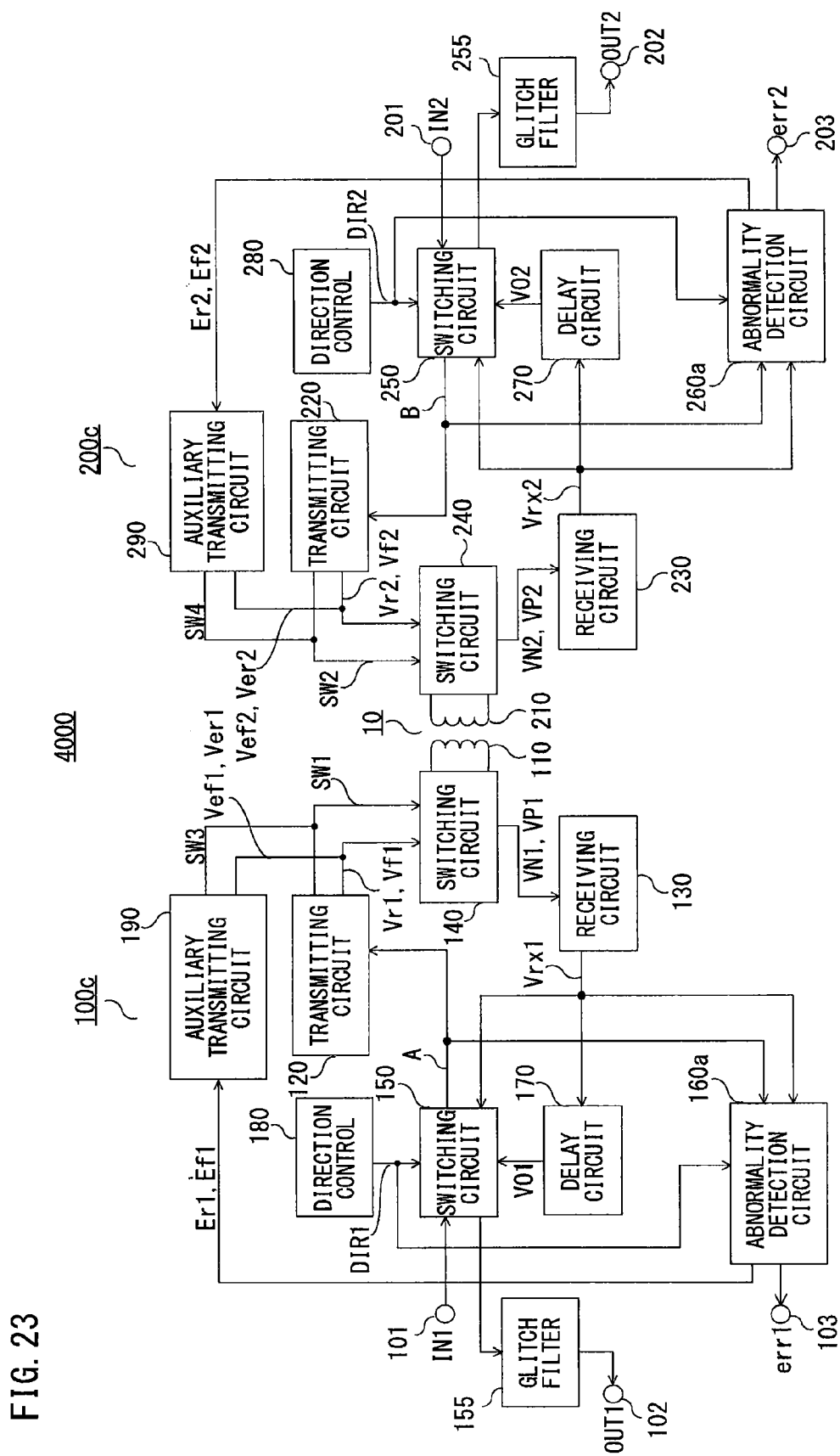
FIG. 23 is a block diagram showing a schematic configuration of a signal transmission circuit according to Embodiment 4 of the present invention.

FIG. 23 is a block diagram showing a schematic configuration of a signal transmission circuit 4000 according to Embodiment 4 of the present invention. In Embodiment 4, first and second glitch filters 155 and 255 are provided between the third and fourth switching circuits 150 and 150 and the output terminals 102 and 202 in the signal transmission circuit 3000 shown in Embodiment 3 described above.

As shown in FIG. 23, the signal transmission circuit 4000 includes: an insulating transformer 10 including a first coil 110 and a second coil 210; a first circuit 100c connected to the first coil 110; and a second circuit 200c connected to the second coil 210, and performs bidirectional signal transmission with abnormality detection by self-diagnosis.

In the first circuit 100c, the first glitch filter 155 is provided between the switch 152 (see FIG. 18) of the third switching circuit 150 and an output terminal 102 of the first circuit 100c. In the second circuit 200c, the second glitch filter 255 is provided between the switch 252 (see FIG. 19) of the fourth switching circuit 250 and an output terminal 202 of the second circuit 200c. Thus, a first output signal OUT1 is outputted via the first glitch filter 155 from the output terminal 102, and a second output signal OUT2 is outputted via the second glitch filter 255 from the output terminal 202. The other configuration is the same as in Embodiment 3 described above.

The first and second glitch filters 155 and 255 serve to remove a short pulse signal having a pulse width equal to or less than a set pulse width Lb. The first glitch filter 155 removes a short pulse signal of the output signal Vrx1 of the first receiving circuit 130. In this case, the first glitch filter 155 delays the signal Vrx1 by a time equivalent to the set pulse width Lb and outputs the first output signal OUT1. Similarly, the second glitch filter 255 removes a short pulse signal of the output signal Vrx2 of the second receiving circuit 230, and in this case, the second glitch filter 255 delays the signal Vrx2 by a time equivalent to the set pulse width Lb and outputs the second output signal OUT2.

Next, an operation of the entire signal transmission circuit 4000 will be described with reference to FIG. 24. In this case, the control signal of the first direction control section 180 is high, the control signal of the second direction control section 280 is low, and a first input signal IN1 inputted to the first circuit 100c is transmitted and outputted as a second output signal OUT2 from the second circuit 200c, but the same applies to the case of the opposite direction.

Figure 24:
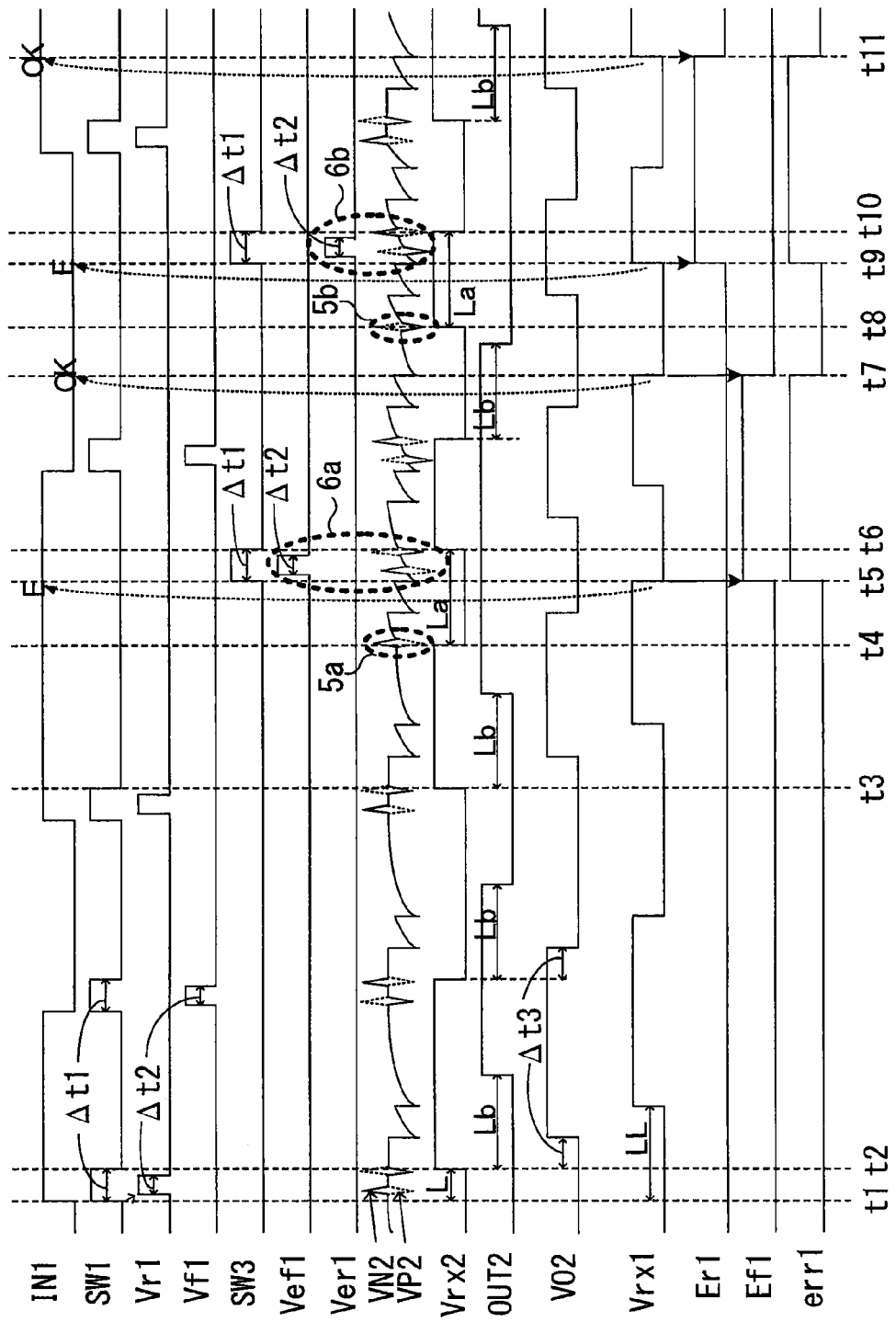
FIG. 24 is a diagram showing an operation waveform of the signal transmission circuit according to Embodiment 4 of the present invention.

FIG. 24 shows operation waveforms of: the first input signal IN1 (the input signal A of the first transmitting circuit 120); the control signal SW1 outputted from the first transmitting circuit 120 to the first switching circuit 140; the transmission signals Vr1 and Vf1 transmitted from the first transmitting circuit 120 to the first end and the second end of the first coil 110, respectively; the control signal SW3 outputted from the first auxiliary transmitting circuit 190 to the first switching circuit 140; the first abnormality correction signals Vef1 and Ver1 transmitted from the first auxiliary transmitting circuit 190 to the first end and the second end of the first coil 110, respectively; the signals VN2 and VP2 generated at the first end and the second end of the second coil 210 and received by the second receiving circuit 230; the output signal Vrx2 of the second receiving circuit 230; the second output signal OUT2; the delay signal VO2 from the second delay circuit 270; the output signal Vrx1 of the first receiving circuit 130; the first abnormality detection signals Er1 and Ef1 outputted from the first abnormality detection circuit 160; and the first abnormality signal err1.

Among the signal waveforms shown in FIG. 24, the signals other than the second output signal OUT2 are generated through the same operation as in Embodiment 3 described above (see FIG. 21). In FIG. 21 for Embodiment 3 described above, the second output signal OUT2 is a signal equal to the output signal Vrx2 of the second receiving circuit 230, but in this embodiment, the second output signal OUT2 and the output signal Vrx2 are different from each other, and the second output signal OUT2 (equal to the signal Vrx2) in Embodiment 3 described above corresponds to the signal Vrx2 in this embodiment.

It is noted that the control signal SW2 outputted from the second transmitting circuit 220 to the second switching circuit 240, the transmission signals Vr2 and Vf2 transmitted from the second transmitting circuit 220 to the first end and the second end of the second coil 210, respectively, and the signals VN1 and VP1 generated at the first end and the second end of the first coil 110 and received by the first receiving circuit 130 are generated in the same manner as in Embodiment 3 described above, and thus are not shown in FIG. 24.

When the control signal of the second direction control section 280 is low, the second abnormality detection circuit 260a does not operate, and all the outputs SW4, Vef2, and Ver1 of the second auxiliary transmitting circuit 290 which operates on the basis of the output of the second abnormality detection circuit 260a are low. Thus, the second switching circuit 240 is controlled on the basis of only the signal SW2, and the transmission signals to the second coil 210 are also only the signals Vr2 and Vf2.

In a normal state, the output signal Vrx2 of the second receiving circuit 230 is generated by delaying the inputted first input signal IN1 by a predetermined period L ($\leq \Delta t1$) with the same waveform, and is further delayed by a predetermined time (the set pulse width Lb) by the second glitch filter 255, and the second output signal OUT2 is outputted. Then, a signal Vrx1 is generated by delaying a delay signal VO2, which is obtained by delaying the output signal Vrx2 of the second receiving circuit 230 by a period $\Delta t3$, further by a predetermined period L ($\leq \Delta t1$) with the same waveform. This signal Vrx1 and the first input signal IN1 are compared with each other to detect abnormality. In a normal state, the signal Vrx1 is a signal obtained by delaying the first input signal IN1 by a period LL ($\leq 2(\Delta t1)+\Delta t3$) with the same waveform.

As shown in FIG. 24, the signal Vrx2 which is an output signal of the second receiving circuit 230 becomes abnormal (low) at time t4 due to occurrence of noise 5a in the signals VN2 and VP2 from the second coil 210 to the second receiving circuit 230, and the first abnormality detection signal Ef1 and the first abnormality signal err1 are high at and after time t5. Thus, a first abnormality correction signal Vef1 which is a high signal having a period $\Delta t2$ is generated, the signal Vrx2 returns at time t6, and the first abnormality detection signal Ef1 and the first abnormality signal err1 become low at time t7. The period (times t4 to t6) from the time when abnormality occurs in the signal Vrx2 to the time when the signal Vrx2 returns is La ($\leq 2(\Delta t1)+\Delta t3$), and the period La is a period which is substantially equal to or slightly shorter than $(2(\Delta t1)+\Delta t3)$.

Then, by the second glitch filter 255, a short pulse signal having a pulse width equal to or less than the set pulse width Lb is removed from the signal Vrx2 and the signal Vrx2 is delayed by a time equivalent to the set pulse width Lb, and the second output signal OUT2 is outputted. The set pulse width Lb is set to be equal to or longer than the period La, which is the period from the time when abnormality occurs in the signal Vrx2 to the time when the signal Vrx2 returns, that is, as Lb$\geq$La. Thus, the abnormality (low) of the signal Vrx2 which occurs during the period La (times t4 to t6) is eliminated as the short pulse signal, and a second output signal OUT2 which is obtained by delaying the first input signal IN1 by a period (L+Lb) with the same waveform and is in a normal state is outputted.

At time t8, the signal Vrx2 becomes abnormal (high) due to occurrence of noise 5b in the signals VN2 and VP2 from the second coil 210 to the second receiving circuit 230. At and after time t9, the first abnormality detection signal Er1 and the first abnormality signal err1 are high. Thus, a first abnormality correction signal Ver1 which is a high signal having a period $\Delta t2$ is generated, the signal Vrx2 returns at time t10, and the first abnormality detection signal Er1 and the first abnormality signal err1 become low at time t11. The period (times t8 to t10) from the time when abnormality occurs in the signal Vrx2 to the time when the signal Vrx2 returns is La ($\leq 2(\Delta t1)+\Delta t3$).

Then, a short pulse signal having a pulse width equal to or less than the set pulse width Lb ($\geq$La) is removed from the signal Vrx2 and the signal Vrx2 is delayed by a time equivalent to the set pulse width Lb by the second glitch filter 255, and the second output signal OUT2 is outputted. Thus, the abnormality (high) of the signal Vrx2 which occurs during the period La (times t8 to t10) is eliminated as the short pulse signal, and a second output signal OUT2 which is obtained by delaying the first input signal IN1 by a period (L+Lb) with the same waveform and is in a normal state is outputted.

In this embodiment, similarly to Embodiment 3 described above, the first abnormality detection circuit 160a of the first circuit 100c at the input side detects abnormality through comparison with the first input signal IN1 (signal A) at the respective timings of rising and falling of the output signal Vrx1 of the first receiving circuit 130, and outputs the first abnormality detection signals Er1 and Ef1 together with the first abnormality signal err1. The first circuit 100c includes the first auxiliary transmitting circuit 190 which generates the first abnormality correction signals Ver1 and Vef1 on the basis of the first abnormality detection signals Er1 and Ef1, respectively, and transmits the first abnormality correction signals Ver1 and Vef1 to the second end and the first end of the first coil. Furthermore, the second circuit 200c at the output side includes the second glitch filter 255 which removes a short pulse signal, and the second output signal OUT2 is outputted via the second glitch filter 255.

Thus, the same effects as those in Embodiment 3 described above are obtained, the output signal Vrx2 of the second receiving circuit 230 whose logical value has changed due to abnormality is forcedly and immediately returned, the first abnormality detection signals Er1 and Ef1 are cancelled, and the first abnormality signal err1 is also immediately cancelled. Furthermore, the abnormality of the signal Vrx2 which occurs during the period La, which is the period from occurrence of abnormality to return, is eliminated as the short pulse signal by the second glitch filter 255, and the second output signal OUT2 which is obtained by delaying the first input signal IN1 by the period (L+Lb) with the same waveform and is in a normal state is outputted.

As described above, the signal transmission circuit 4000 according to this embodiment can perform abnormality detection through self-diagnosis, can immediately perform abnormality elimination, can further remove influence of abnormality, and can generate an output signal (the second output signal OUT2).

This case has been described only for one direction, but the same applies to the case of the opposite direction, and in bidirectional signal transmission, it is possible to immediately perform abnormality elimination, further remove influence of abnormality, and generate an output signal.

Embodiment 5

Although the signal transmission circuits 1000 to 4000 which enable bidirectional signal transmission have been described above in Embodiments 1 to 4, a signal transmission circuit which transmits a signal only in one direction will be described in Embodiment 4.

Figure 25:
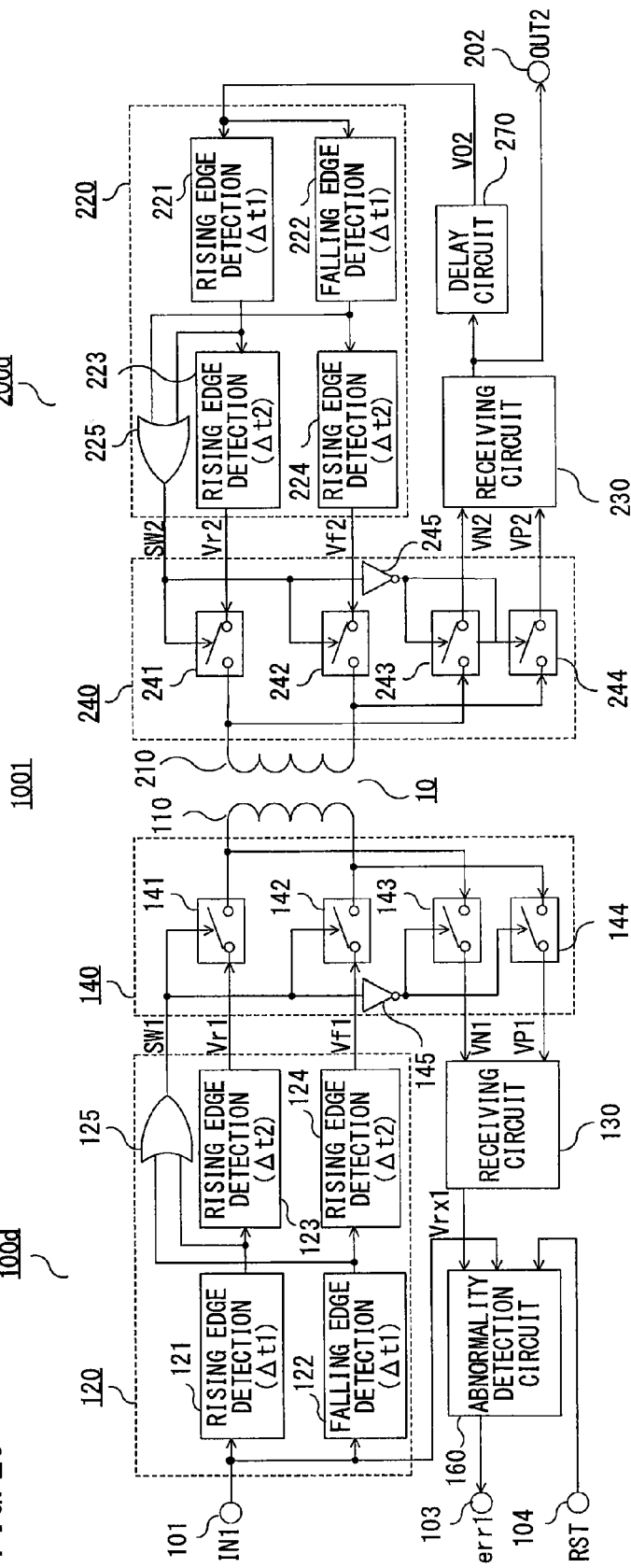
FIG. 25 is a diagram showing the circuit configuration of a signal transmission circuit according to Embodiment 5 of the present invention.

FIG. 25 is a circuit diagram showing the configuration of a signal transmission circuit 1001 according to Embodiment 5 of the present invention. As shown in FIG. 13, the signal transmission circuit 1001 includes an insulating transformer 10 including a first coil 110 and a second coil 210, a first circuit 100d connected to the first coil 110, and a second circuit 200d connected to the second coil 210, and performs signal transmission with abnormality detection by self-diagnosis.

The first circuit 100d includes a first transmitting circuit 120, a first receiving circuit 130, a first switching circuit 140, and a first abnormality detection circuit 160. In addition, the second circuit 200d includes a second transmitting circuit 220, a second receiving circuit 230, a second switching circuit 240, and a second delay circuit 270. The first transmitting circuit 120, the first receiving circuit 130, the first switching circuit 140, the first abnormality detection circuit 160, the second transmitting circuit 220, the second receiving circuit, the second switching circuit 240, and the second delay circuit 270 have the same configuration as in the above-described embodiments.

In this case, the signal transmission circuit 1001 includes an input terminal 101, an abnormality output terminal 103, and a reset terminal 104 at the first circuit 100d side, and includes an output terminal 202 at the second circuit 200d side. A signal inputted through the reset terminal 104 is inputted to the reset terminal RST of each of the DFF circuits 61 to 64 within the first abnormality detection circuit 160, and serves similarly to the control signal of the first direction control section 180 shown in Embodiment 1 described above, to cause the first abnormality detection circuit 160 to be operable.

An operation of the signal transmission circuit 1001 is the same as in the case where the control signal of the first direction control section 180 is high and the control signal of the second direction control section 280 is low in Embodiment 1 described above. Through the same operation as described with reference to FIG. 5 for Embodiment 1 described above, the first input signal IN1 inputted to the input terminal 101 of the first circuit 100d is transmitted via the insulating transformer 10 and outputted as the second output signal OUT2 from the output terminal 202 of the second circuit 200d, and the first abnormality signal err1 is outputted from the abnormality output terminal 103 of the first circuit 100d through self-diagnosis.

Thus, it is possible to achieve signal transmission and self-diagnosis by using the common insulating transformer 10, and it is possible to provide a low-cost signal transmission circuit which has a self-diagnosis function with a simple circuit configuration having a decreased circuit area and a decreased mounting area.

As shown in Embodiment 2 described above, the capacitors 31 and 32 may be connected between the first receiving circuit 130 and the two switches 143 and 144 within the first switching circuit 140, respectively, and similarly to Embodiment 2 described above, it is possible to suppress distortion of the received signals of the receiving circuits 130 and 230 which is caused when the signals SW1 and SW2 change.

The first abnormality detection circuit 160a shown in Embodiment 3 describe above may be used, and the first auxiliary transmitting circuit 190 may be provided which generates the first abnormality correction signals Ver1 and Vef1 and transmits the first abnormality correction signals Ver1 and Vef1 to the second end and the first end of the first coil. Similarly to Embodiment 3 described above, it is possible to immediately return to normal through abnormality correction. Moreover, the second glitch filter 255 shown in Embodiment 4 described above may be provided, and similarly to Embodiment 4 described above, an output signal in a normal state in which influence of abnormality is removed is obtained.

Embodiment 6

Figure 26:
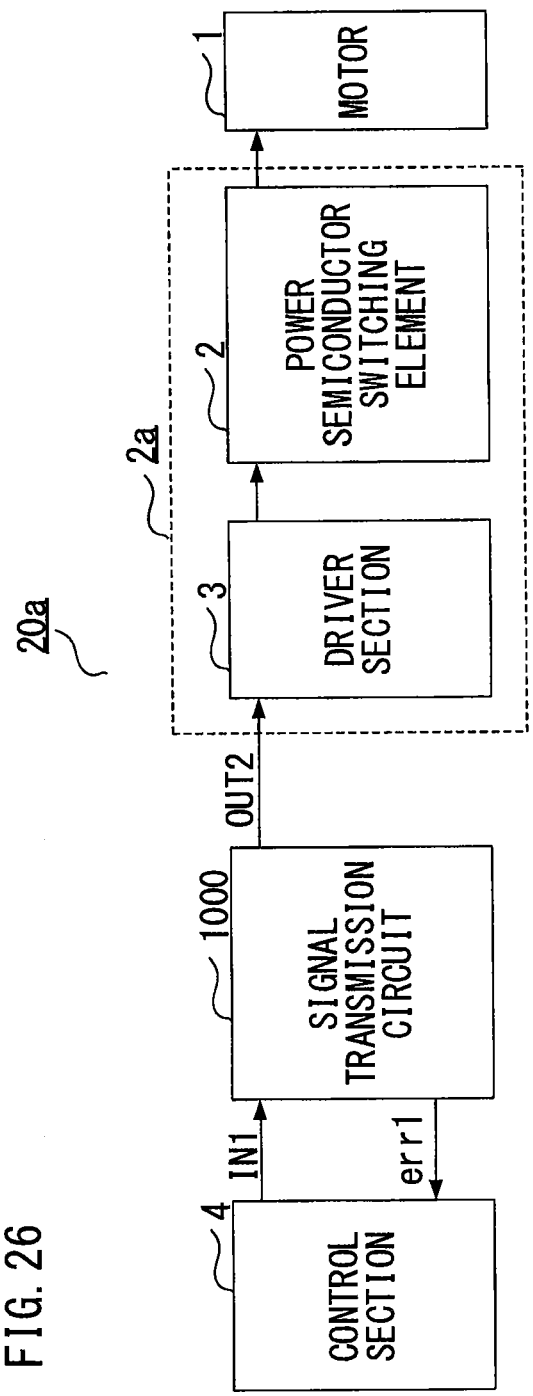
FIG. 26 is a configuration diagram in which a power conversion device according to Embodiment 6 of the present invention is applied to motor control.

FIG. 26 is a configuration diagram in which a power conversion device according to Embodiment 6 of the invention is applied to motor control. Here, a power conversion device 20a including the signal transmission circuit 1000 according to Embodiment 1 described above will be described, but the same applies to the cases of including the signal transmission circuits 2000 to 4000 and 1001 according to Embodiments 2 to 5.

In this case, only signal transmission in one direction is illustrated for convenience, but bidirectional signal transmission is enabled in the case of using the signal transmission circuits 1000 to 4000 according to Embodiments 1 to 4.

As shown in FIG. 26, the power conversion device 20a which controls a motor 1 used in a hybrid vehicle, an electric vehicle, or the like includes: a power module 2a including one or a plurality of power semiconductor switching elements 2 and a driver section 3 which are sealed with a resin; a control section 4 which generates a control signal for controlling the power semiconductor switching element 2; and the signal transmission circuit 1000 which transmits the control signal from the control section 4 to the driver section 3.

The signal transmission circuit 1000 is connected between the control section 4 and the driver section 3 to insulate the driver section 3, the power semiconductor switching element 2, and a device controlled at high voltage, such as the motor 1, from the control section 4, receives the control signal from the control section 4 as the first input signal IN1, outputs the control signal as the second output signal OUT2, and also outputs the first abnormality signal err1 to the control section 4 through self-diagnosis.

In this embodiment, the power conversion device 20a includes the low-cost signal transmission circuit 1000 having a self-diagnosis function with a simple circuit configuration having a decreased circuit area and a decreased mounting area, and further includes the power module 2a including the power semiconductor switching element 2 and the driver section 3. Thus, it is possible to further promote size reduction and cost reduction of the power conversion device 20a.

Figure 27:
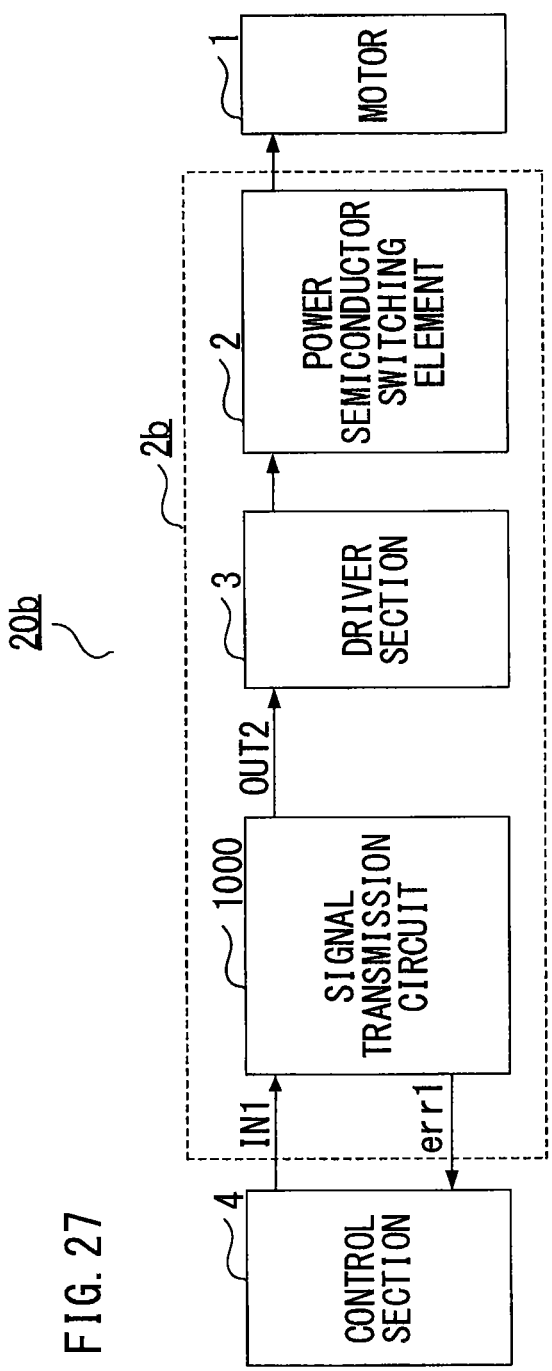
FIG. 27 is a configuration diagram in which a power conversion device according to another example of Embodiment 6 of the present invention is applied to motor control.

As shown in FIG. 27, a power conversion device 20b including a power module 2b which includes the power semiconductor switching element 2, the driver section 3, and the signal transmission circuit 1000 which are sealed with a resin may be used, and the same effects are obtained.

Figure 28:
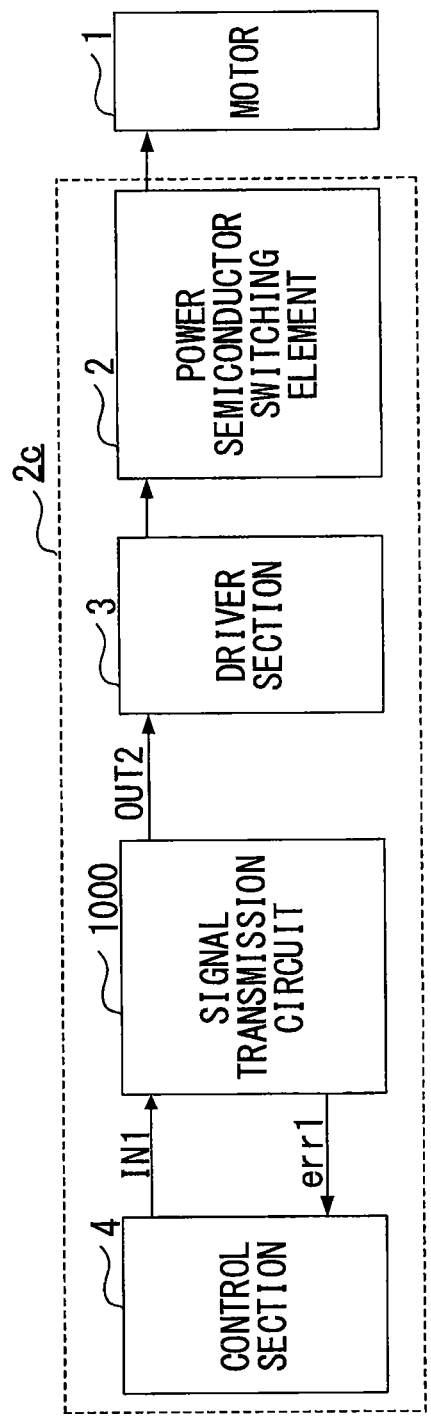
FIG. 28 is a configuration diagram in which a power conversion device according to another example of Embodiment 6 of the present invention is applied to motor control.

In addition, as shown in FIG. 28, a power conversion device 20c including a power module 2c which includes the power semiconductor switching element 2, the driver section 3, the signal transmission circuit 1000, and the control section 4 which are sealed with a resin may be used, and the same effects are obtained.

It is noted that, within the scope of the present invention, the above embodiments may be freely combined with each other, or each of the above embodiments may be modified or abbreviated as appropriate.

The invention claimed is:

1. A signal transmission circuit comprising:
    an insulating transformer including a first coil and a second coil;
    a first circuit connected to the first coil; and
    a second circuit connected to the second coil, the signal transmission circuit transmitting a first input signal inputted to the first circuit and outputting the transmitted signal as a second output signal from the second circuit, wherein
    the first circuit includes:
        a first transmitting circuit for generating and outputting a transmission signal to the first coil in accordance with change in a logical value of an inputted signal A;
        a first receiving circuit for receiving a signal from the first coil, demodulating the signal into a binary signal having a logical value, and outputting the binary signal;

a first switching circuit for switching a connection destination of the first coil between the first transmitting circuit and the first receiving circuit; and a first abnormality detection circuit for comparing the output signal from the first receiving circuit with the signal A to be inputted to the first transmitting circuit, to detect abnormality, and outputting a first abnormality signal, the second circuit includes:

a second transmitting circuit for generating and outputting a transmission signal to the second coil in accordance with change in a logical value of an inputted signal B;

a second receiving circuit for receiving a signal from the second coil, demodulating the signal into a binary signal having a logical value, and outputting the binary signal;

a second switching circuit for switching a connection destination of the second coil between the second transmitting circuit and the second receiving circuit; and a second delay circuit for outputting a delay signal obtained by delaying the output signal from the second receiving circuit by a set time, the first input signal inputted to the first circuit is inputted as the signal A to the first transmitting circuit, the transmission signal from the first transmitting circuit is received via the insulating transformer by the second receiving circuit of the second circuit, and the output signal of the second receiving circuit is outputted as the second output signal from the second circuit, and the delay signal obtained by the delaying by the second delay circuit of the second circuit is inputted as the signal B to the second transmitting circuit, the transmission signal from the second transmitting circuit is received via the insulating transformer by the first receiving circuit of the first circuit, and the first abnormality signal outputted by the first abnormality detection circuit on the basis of the output signal of the first receiving circuit and the signal A is outputted from the first circuit.

2. The signal transmission circuit according to claim 1, wherein the first switching circuit is controlled in accordance with change in the logical value of the signal A, and the second switching circuit is controlled in accordance with change in the logical value of the signal B, the second switching circuit switches and selects the second receiving circuit during a period when the first switching circuit switches and selects the first transmitting circuit, and the first switching circuit switches and selects the first receiving circuit during a period when the second switching circuit switches and selects the second transmitting circuit.

3. The signal transmission circuit according to claim 1, wherein the first circuit further includes:

a first delay circuit for outputting a delay signal obtained by delaying the output signal from the first receiving circuit by a set time; and a third switching circuit for switching and selecting the signal A to be inputted to the first transmitting circuit between the first input signal and the delay signal from the first delay circuit, and outputting the output signal from the first receiving circuit as a first output signal from the first circuit when selecting the delay signal, the second circuit further includes:

a second abnormality detection circuit for comparing the output signal from the second receiving circuit with the signal B to be inputted to the second transmitting circuit, to detect abnormality, and outputting a second abnormality signal; and a fourth switching circuit for switching and selecting the signal B to be inputted to the second transmitting circuit between a second input signal inputted to the second circuit and the delay signal from the second delay circuit, and outputting the output signal from the second receiving circuit as the second output signal from the second circuit when selecting the delay signal, the signal transmission circuit has a bidirectional signal transmission function, when the second input signal inputted to the second circuit is inputted as the signal B to the second transmitting circuit, the transmission signal from the second transmitting circuit is received via the insulating transformer by the first receiving circuit of the first circuit, and the output signal of the first receiving circuit is outputted as the first output signal from the first circuit, and the delay signal obtained by the delaying by the first delay circuit of the first circuit is inputted as the signal A to the first transmitting circuit, the transmission signal from the first transmitting circuit is received via the insulating transformer by the second receiving circuit of the second circuit, and the second abnormality signal outputted by the second abnormality detection circuit on the basis of the output signal of the second receiving circuit and the signal B is outputted from the second circuit.

4. The signal transmission circuit according to claim 3, wherein the fourth switching circuit selects the delay signal from the second delay circuit during a period when the third switching circuit selects the first input signal, and the fourth switching circuit selects the second input signal during a period when the third switching circuit selects the delay signal from the first delay circuit.

5. The signal transmission circuit according to claim 3, wherein the first switching circuit is controlled in accordance with change in the logical value of the signal A, and the second switching circuit is controlled in accordance with change in the logical value of the signal B, the second switching circuit switches and selects the second receiving circuit during a period when the first switching circuit switches and selects the first transmitting circuit, and the first switching circuit switches and selects the first receiving circuit during a period when the second switching circuit switches and selects the second transmitting circuit.

6. The signal transmission circuit according to claim 3, wherein the first abnormality detection circuit detects abnormality through comparison with the signal A at respective timings of rising and falling of the output signal from the first receiving circuit and outputs abnormality detection signals, and also outputs the first abnormality signal, the first circuit includes a first auxiliary transmitting circuit for generating an abnormality correction signal on the basis of each of the abnormality detection signals and transmitting the abnormality correction signal to the first coil, and transmits the signals from the first transmitting circuit and the first auxiliary transmitting circuit to the first coil, the second abnormality detection circuit detects abnormality through comparison with the signal B at respective timings of rising and falling of the output signal from the second receiving circuit and outputs abnormality detection signals, and also outputs the second abnormality signal, and the second circuit includes a second auxiliary transmitting circuit for generating an abnormality correction signal on the basis of each of the abnormality detection signals and transmitting the abnormality correction signal to the second coil, and transmits the signals from the second transmitting circuit and the second auxiliary transmitting circuit to the second coil.

7. The signal transmission circuit according to claim 6, wherein the first circuit includes a first glitch filter, and outputs the first output signal via the first glitch filter, thereby removing a short pulse signal having a pulse width equal to or less than a set pulse width in the first output signal and delaying the first output signal by a time equivalent to the set pulse width, and the second circuit includes a second glitch filter, and outputs the second output signal via the second glitch filter, thereby removing a short pulse signal having a pulse width equal to or less than a set pulse width in the second output signal and delaying the second output signal by a time equivalent to the set pulse width.

8. The signal transmission circuit according to claim 3, further comprising a direction control section for controlling a signal transmission direction, wherein on the basis of a control signal from the direction control section, the third switching circuit and the fourth switching circuit operate, and the first abnormality detection circuit and the second abnormality detection circuit operate.

9. The signal transmission circuit according to claim 1, wherein the first receiving circuit and the second receiving circuit include capacitors at input sides thereof, respectively, and receive the signals from the first coil and the second coil via the respective capacitors.

10. The signal transmission circuit according to claim 1, wherein the first transmitting circuit transmits two types of signals generated by further detecting rising in first edge detection signals generated by detecting rising and falling of the signal A, to one end and another end of the first coil, respectively, the second transmitting circuit transmits two types of signals generated by further detecting rising in second edge detection signals generated by detecting rising and falling of the signal B, to one end and another end of the second coil, respectively, the first receiving circuit receives the respective signals from the one end and the other end of the first coil and generates a binary signal, and the second receiving circuit receive the respective signals from the one end and the other end of the second coil and generates a binary signal.

11. The signal transmission circuit according to claim 10, wherein the first edge detection signals generated by the first transmitting circuit control the first switching circuit, the second edge detection signals generated by the second transmitting circuit control the second switching circuit, and there is no period when the first edge detection signals and the second edge detection signals overlap.

12. The signal transmission circuit according to claim 1, wherein the first abnormality detection circuit detects abnormality through comparison with the signal A at respective timings of rising and falling of the output signal from the first receiving circuit and outputs abnormality detection signals, and also outputs the first abnormality signal, and the first circuit includes a first auxiliary transmitting circuit for generating an abnormality correction signal on the basis of each of the abnormality detection signals and transmitting the abnormality correction signal to the first coil, and transmits the signals from the first transmitting circuit and the first auxiliary transmitting circuit to the first coil.

13. The signal transmission circuit according to claim 12, wherein the second circuit includes a second glitch filter, and outputs the second output signal via the second glitch filter, thereby removing a short pulse signal having a pulse width equal to or less than a set pulse width in the second output signal and delaying the second output signal by a time equivalent to the set pulse width.

14. The signal transmission circuit according to claim 1, wherein the signal transmission circuit is connected between a control section and a drive circuit for a power semiconductor switching element to insulate the control section and the drive circuit from each other, receives a control signal from the control section as the first input signal, outputs the control signal as the second output signal to the drive circuit, and outputs the first abnormality signal to the control section.

15. A power conversion device comprising:
a power semiconductor switching element;
a drive circuit for driving the power semiconductor switching element;
a control section for generating a control signal for controlling the power semiconductor switching element; and
a signal transmission circuit connected between the control section and the drive circuit to insulate the control section and the drive circuit from each other, the signal transmission circuit transmitting a control signal from the control section to the drive circuit, wherein the signal transmission circuit includes:
an insulating transformer including a first coil and a second coil;
a first circuit connected to the first coil; and
a second circuit connected to the second coil,
the first circuit includes:
a first transmitting circuit for generating and outputting a transmission signal to the first coil in accordance with change in a logical value of an inputted signal A;
a first receiving circuit for receiving a signal from the first coil, demodulating the signal into a binary signal having a logical value, and outputting the binary signal;
a first switching circuit for switching a connection destination of the first coil between the first transmitting circuit and the first receiving circuit; and a first abnormality detection circuit for comparing the output signal from the first receiving circuit with the signal A to be inputted to the first transmitting circuit, to detect abnormality, and outputting a first abnormality signal, the second circuit includes:
a second transmitting circuit for generating and outputting a transmission signal to the second coil in accordance with change in a logical value of an inputted signal B;
a second receiving circuit for receiving a signal from the second coil, demodulating the signal into a binary signal having a logical value, and outputting the binary signal;
a second switching circuit for switching a connection destination of the second coil between the second transmitting circuit and the second receiving circuit; and
a second delay circuit for outputting a delay signal obtained by delaying the output signal from the second receiving circuit by a set time, the control signal inputted from the control section to the first circuit is inputted as the signal A to the first transmitting circuit, the transmission signal from the first transmitting circuit is received via the insulating transformer by the second receiving circuit of the second circuit, and the output signal of the second receiving circuit is outputted from the second circuit to the drive circuit, and the delay signal obtained by the delaying by the second delay circuit of the second circuit is inputted as the signal B to the second transmitting circuit, the transmission signal from the second transmitting circuit is received via the insulating transformer by the first receiving circuit of the first circuit, and the first abnormality signal outputted by the first abnormality detection circuit on the basis of the output signal of the first receiving circuit and the signal A is outputted from the first circuit to the control section.

16. The power conversion device according to claim 15, wherein in the signal transmission circuit, the first circuit further includes:
a first delay circuit for outputting a delay signal obtained by delaying the output signal from the first receiving circuit by a set time; and
a third switching circuit for switching and selecting the signal A to be inputted to the first transmitting circuit between the control signal and the delay signal from the first delay circuit, and outputting the output signal from the first receiving circuit from the first circuit when selecting the delay signal, the second circuit further includes:
a second abnormality detection circuit for comparing the output signal from the second receiving circuit with the signal B to be inputted to the second transmitting circuit, to detect abnormality, and outputting a second abnormality signal; and
a fourth switching circuit for switching and selecting the signal B to be inputted to the second transmitting circuit between an input signal inputted to the second circuit and the delay signal from the second delay circuit, and outputting the output signal from the second receiving circuit from the second circuit when selecting the delay signal, the signal transmission circuit has a bidirectional signal transmission function, when the input signal inputted to the second circuit is inputted as the signal B to the second transmitting circuit, the transmission signal from the second transmitting circuit is received via the insulating transformer by the first receiving circuit of the first circuit, and the output signal of the first receiving circuit is outputted from the first circuit, and the delay signal obtained by the delaying by the first delay circuit of the first circuit is inputted as the signal A to the first transmitting circuit, the transmission signal from the first transmitting circuit is received via the insulating transformer by the second receiving circuit of the second circuit, and the second abnormality signal outputted by the second abnormality detection circuit on the basis of the output signal of the second receiving circuit and the signal B is outputted from the second circuit.

17. The power conversion device according to claim 15, further comprising a power module including the drive circuit and the power semiconductor switching element.

18. The power conversion device according to claim 15, further comprising a power module including the signal transmission circuit, the drive circuit, and the power semiconductor switching element.

19. The power conversion device according to claim 15, further comprising a power module including the control section, the signal transmission circuit, the drive circuit, and the power semiconductor switching element.

* * * * *